US007493364B2

(12) United States Patent
Kawamura et al.

(10) Patent No.: US 7,493,364 B2
(45) Date of Patent: Feb. 17, 2009

(54) SERVICE RETRIEVAL APPARATUS AND SERVICE RETRIEVAL METHOD

(75) Inventors: Takahiro Kawamura, Kawasaki (JP); Tetsuo Hasegawa, Tokyo (JP); Akihiko Ohsuga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 935 days.

(21) Appl. No.: 10/805,252

(22) Filed: Mar. 22, 2004

(65) Prior Publication Data

US 2005/0050026 A1 Mar. 3, 2005

(30) Foreign Application Priority Data

Aug. 26, 2003 (JP) ............................. 2003-301267

(51) Int. Cl.
*G06F 17/30* (2006.01)
*G06F 15/16* (2006.01)
*G06F 7/00* (2006.01)
(52) U.S. Cl. .......................................... 709/204; 707/3
(58) Field of Classification Search ....................... None
See application file for complete search history.

(56) References Cited

U.S. PATENT DOCUMENTS

| 6,430,559 | B1 * | 8/2002 | Zhai | 707/5 |
| 6,618,764 | B1 * | 9/2003 | Shteyn | 709/249 |
| 6,862,594 | B1 * | 3/2005 | Saulpaugh et al. | 707/10 |
| 6,959,327 | B1 * | 10/2005 | Vogl et al. | 709/219 |

| 2002/0059220 | A1 * | 5/2002 | Little | 707/5 |

FOREIGN PATENT DOCUMENTS

JP 2000-196636 7/2000

OTHER PUBLICATIONS

UPnP Technology News Letters, www.upnp.org, Sep. 18, 2003.
Jini Technology, www.jini.org, Sep. 18, 2003.
Home Audio Video Interoperability, HAV, www.havi.org, Sep. 18, 2003.
T. Hasegawa et al., "Information Service Search Support Apparatus, Information Service Search Apparatus, and Information Service Search Method", U.S. Appl. No. 10/606,243, filed Jun. 26, 2003.

* cited by examiner

*Primary Examiner*—Ario Etienne
*Assistant Examiner*—Clayton R Williams
(74) *Attorney, Agent, or Firm*—Finnegan, Henderson, Farabow, Garrett & Dunner, L.L.P.

(57) ABSTRACT

A service retrieval apparatus stores service data items, each including two words as input and output items and expression as condition, receives request data item including word as input item and expression as condition, acquires first word set which is set of words having meanings identical/similar to meaning of word as input item in request data item, retrieves group of service data items in each of which one word of first word set is included as input item, calculates condition similarity between meaning of expression in each one of group and meaning of expression in request data item, calculates priority of each one of group based on similarity between word as input item in each one of group and word as input item in request data item and condition similarity, and transmits list including priority and address of appliance which correspond to each one of group to first appliance.

14 Claims, 20 Drawing Sheets

| XA | XB |
|---|---|
| There is operaton log recorded within 3 min. ⋮ User is present nearby ⋮ | User is present nearby ⋮ Emergency contact can be reached ⋮ |

FIG. 11

Retrieval result

| Priority | Address of appliance | Service description file |
|---|---|---|
| 1 | AP2 | Service description file |
| 2 ⋮ | ) | ) |

FIG. 12

SERVICE RETRIEVAL APPARATUS AND SERVICE RETRIEVAL METHOD

CROSS-REFERENCE TO RELATED APPLICATIONS

This application is based upon and claims the benefit of priority from prior Japanese Patent Application No. 2003-301267, filed Aug. 26, 2003, the entire contents of which are incorporated herein by reference.

BACKGROUND OF THE INVENTION

1. Field of the Invention

The present invention relates to a technique of retrieving a desired function among a plurality of home appliances respectively having different functions.

2. Description of the Related Art

The following are existing appliance/device connectivity techniques and their characteristics.

UPnP (Universal Plug and Play) is a technique of performing retrieval based on the type names of appliances/devices, the type names of devices, and device names. HAVi (Home Audio/Video interoperability) is a technique of performing retrieval based on IDs and attributes (function type names and vendor names) and a standard for AV appliances. There is some technique of performing retrieval based on the functions of appliances as well as the types of appliances.

Assume that the number of appliances that can simultaneously access one appliance is determined in advance. For such a case, there is also available a technique (exclusive control) for allowing access to the appliance within this limit (e.g., Jpn. Pat. Appln. KOKAI Publication No. 2001-196636).

Conventionally, connection between appliances (devices), has been established by using the type names of appliances (devices), limitations and the like predetermined for the respective appliances. However, since the names of the respective appliances, the name of an appliance to be found at the time of retrieval, limitations of the respective appliances, and the like are statically written in advance in the respective appliances, only static connection relationships can be established.

According to the conventional techniques described above, therefore, it is difficult to retrieve an optimal appliance suitable for one of various kinds of requests from various kinds of appliances among various kinds of functions (services) used in the home and appliances that are assumed to be in various states.

BRIEF SUMMARY OF THE INVENTION

It is an object of the present invention to provide a service retrieval apparatus and service retrieval method which can easily retrieve optimal appliances suitable for one of various kinds of requests from various kinds of appliances among various appliances which perform various kinds of functions (services) used in the home and which are assumed to be in various states.

(1) According to first aspect of the present invention, there is provided a service retrieval apparatus which retrieves, from a plurality of service functions of a plurality of appliances, a service function identical or similar to a first function requested from a first appliance which is one of the appliances, comprising: a first storing unit configured to store a plurality of service data items, each of the service data items including a word corresponding to an input item, a word corresponding to an output item, and an expression corresponding to a condition, the input and output items representing one of the service functions; a second storing unit configured to store a plurality of words and information representing correlations among the words on the basis of meanings of the words; a first receiving unit configured to receive a request data item which is transmitted from the first appliance and includes at least a word corresponding to the input item of the input and output items representing the first function, and an expression corresponding to the condition; an acquiring unit configured to acquire, from the words stored in the second storing unit, a first word set which is a set of words having meanings identical or similar to a meaning of the word corresponding to the input item in the request data item; a retrieving unit configured to retrieve, from the service data items, a group of service data items in each of which one word of the first word set is included as the input item; a first calculating unit configured to calculate a condition similarity between a meaning of an expression corresponding to the condition in each service data item of the group and a meaning of an expression corresponding to the condition in the request data item; a second calculating unit configured to calculate a priority of the each service data item of the group on the basis of a first similarity between the word corresponding to the input item in the each service data item and the word corresponding to the input item in the request data item and the condition similarity; and a first transmitting unit configured to transmit a list to the first appliance, the list including at least the priority an address of an appliance of the appliances which correspond to the each service data item of the group.

(2) According to second aspect of the present invention, there is provided a service retrieval method for retrieving, from a plurality of service functions of a plurality of appliances, a service function identical or similar to a first function requested from a first appliance which is one of the appliances, the method comprising: (a) storing a plurality of service data items in the first memory device, each of the service data items including a word corresponding to an input item, a word corresponding to an output item, and an expression corresponding to a condition, the input and output items representing one of the service functions; (b) storing a plurality of words and information representing correlations among the words on the basis of meanings of the words, in the second memory device; (c) receiving a request data item which is transmitted from the first appliance and includes at least a word corresponding to the input item of the input and output items representing the first function, and an expression corresponding to the condition; (d) acquiring from the words stored in the second memory device, a first word set which is a set of words having meanings identical or similar to a meaning of the word corresponding to the input item in the request data item; (e) retrieving from the service data items, a group of service data items in each of which one word of the first word set is included as the input item; (f) calculating a condition similarity between a meaning of an expression corresponding to the condition in each service data item of the group and a meaning of an expression corresponding to the condition in the request data item; (g) calculating a priority of the each service data item of the group on the basis of a first similarity between the word corresponding to the input item in the each service data item and the word corresponding to the input item in the request data item and the condition similarity; and (h) transmitting a list to the first appliance, the list including at least the priority and an address of an appliance of the appliances which correspond to the each service data item.

BRIEF DESCRIPTION OF THE SEVERAL VIEWS OF THE DRAWING

FIG. 11 is a view showing an example of a list of rules between a plurality of expressions described in conditions;

FIG. 12 is a view showing an example of a list of retrieval results;

DETAILED DESCRIPTION OF THE INVENTION

First Embodiment

Figure 1:
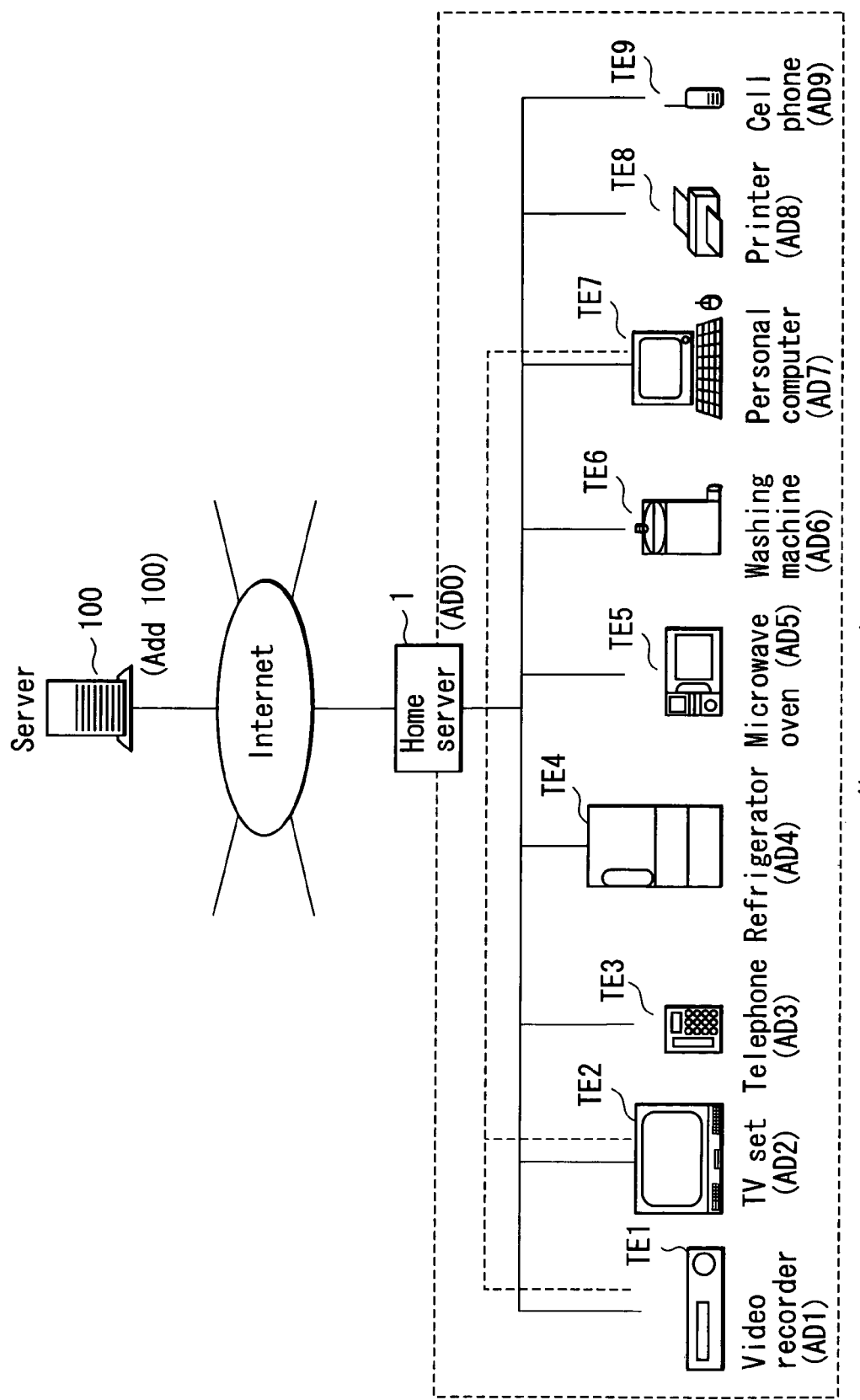
FIG. 1 is a view showing an example of the overall schematic arrangement of a system according to an embodiment of the present invention.

FIG. 1 shows an example of the overall arrangement of a system obtained by connecting the first network having a plurality of appliances TE1 to TE9 and a home server 1 and the second network such as the Internet through the home server 1.

The plurality of appliances TE1 to TE9 are appliances (e.g., home electric appliances) such as a video recorder, TV set, telephone, refrigerator, microwave oven, washing machine, personal computer, printer, and cell phone, which are often used in the home. The first network obtained by connecting these appliances to the home server 1 through 100 Base-TX, IEEE802.11a, b, g, IEEE1394, HomePlug, or the like will be referred to as a home network. The home server 1 is so connected to a provider for connection to the second network (the Internet in this case) as to be communicable through a telephone line, indoor wire, optical fiber, radio, or the like.

The appliances TE1 to TE9 and home server 1 respectively have addresses for communication with other appliances in the home network or connected to the Internet. Assume that the addresses of the home server 1 and the appliances TE1 to TE9 are "AD0" to "AD9", respectively.

A server 100 is connected to the Internet. Assume that the address of the server 100 is "Add100".

In general, some home servers have various functions, e.g., temporarily storing TV broadcast programs, data broadcasts, and large-volume contents provided through the network to realize "home video/data on demand". The home server 1 in FIG. 1 has a service retrieval function (matchmaker) of retrieving, from the service functions (to be described later) of the respective appliances TE1 to TE9, a service function identical or similar to the content of the service requested from one of the appliances TE1 to TE9. The home server 1 also has a function of controlling communication among the respective appliances TE1 to TE9 connected inside the home network and an interface function for communication between appliances on the Internet and the respective appliances TE1 to TE9 connected inside the home network.

The appliances TE1 to TE9 respectively have unique functions (main functions). For example, the appliance TE2 has a TV function as its main function, and the appliance TE8 has a printer function as its main function. Functions of the main functions of the respective appliances TE1 to TE9 which can be offered to other appliances will be referred to as service functions. A file that represents the content of the service function of each of the appliances TE1 to TE9, the current state of the appliance, and the like will be referred to as a service description file. The home server 1 stores the service description files sent from the respective appliances TE1 to TE9.

All or some of the appliances TE1 to TE9 implement desired functions by borrowing the service functions of other appliances. A function of implementing desired operation by borrowing the service functions of other appliances will be referred to as a service request function. Of the appliances TE1 to TE9, an appliance having the service request function transmits, to the home server 1, a description file (request service description file) in which the content of a service which the appliance requests of other appliances and a condition of the current state or the like of the other appliances are described.

Upon receiving a request service description file from any appliance (request source appliance) of the appliances TE1 to TE9, the home server 1 retrieves one or more service description files in each of which a service that satisfies (or is identical or similar to) the content of the service described in the request service description file, from the stored service description files (function retrieval). The home server 1 further retrieves, from retrieved one or more service description files which are function retrieval results, one or more service description files in each of which a condition that satisfies (or is identical or similar to) the condition described in the request service description file (condition retrieval). A combination of function retrieval and condition retrieval may sometimes be called service retrieval. The service retrieval results are then transmitted to the request source appliance.

The request source appliance selects one of a plurality of service description files included in the retrieval results. The request source appliance then requests another appliance corresponding to the selected service description file to execute the service. As a consequence, the request source appliance can realize desired operation by borrowing the service function of the another appliance which corresponds to the selected service description file.

Figure 2:
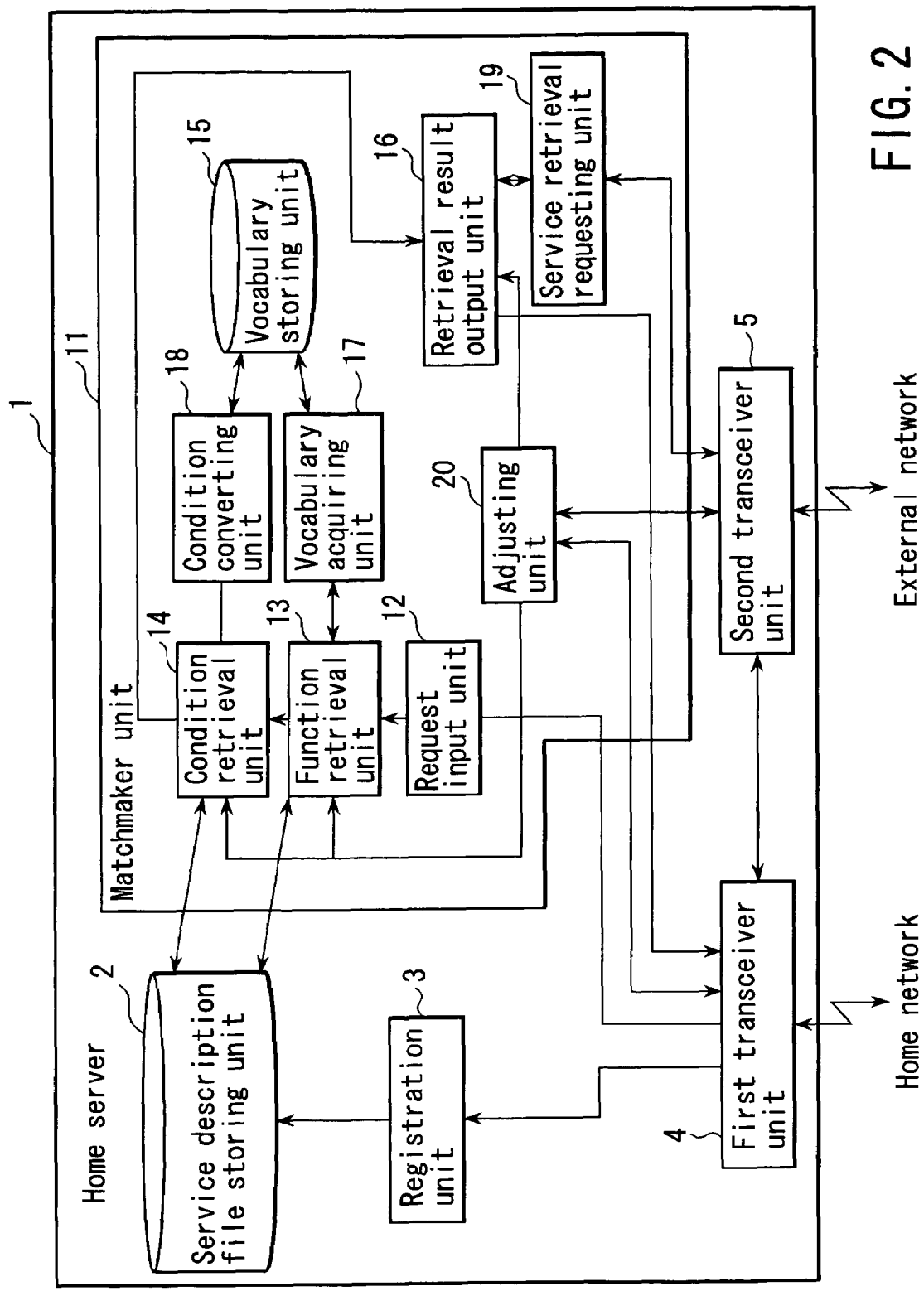
FIG. 2 is a block diagram showing an example of the arrangement of a home server.

FIG. 2 schematically shows an example of the arrangement of the main part of the home server 1. The home server 1 is roughly constituted by a service description file storing unit 2, registration unit 3, first transceiver unit 4, second transceiver unit 5, and matchmaker unit 11.

The first transceiver unit 4 receives various kinds of packets (messages) transmitted from the respective appliances TE1 to TE9, and transmits various kinds of packets to the respective appliances TE1 to TE9 through the home network.

If no appliance corresponding to the destination address of the packed received by the first transceiver unit 4 exists on the home network (e.g., if the packet is addressed to an appliance on the Internet or the server 100), the second transceiver unit 5 sends out the packet to the Internet. The second transceiver unit 5 also receives packets addressed to the home server 1 and the appliances TE1 to TE9 from the Internet. In addition, the second transceiver unit 5 transmits packets that are generated inside the home server 1 and addressed to an appliance on the Internet or the server 100.

Upon receiving packets including service description files which are transmitted from the appliances TE1 to TE9 on the home network, the first transceiver unit 4 transfers the packets to the registration unit 3. The registration unit 3 stores the service description files in the service description file storing unit 2.

Figure 5:
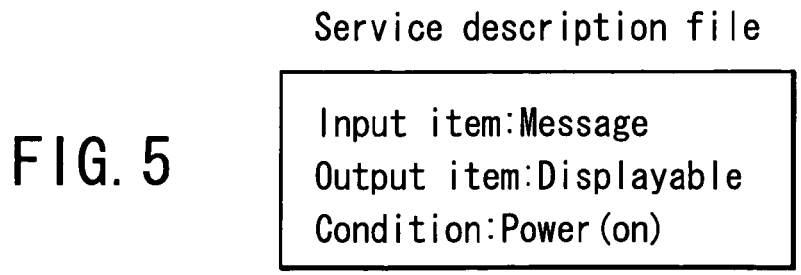
FIG. 5 is a view showing an example of the data format of a service description file.

FIG. 5 shows an example of the data format of a service description file. In a service description file, the following at least three pieces of information are described: an input item and output item which represent the service function provided by each of the appliances TE1 to TE9, and a condition representing the current state or the like of each of the appliances TE1 to TE9. In the input item, a word concerning a input method of the service function is described. In an output item, a word concerning output method of the service function output method is described. For example, in the input item of a service description file, information designating input information data, an input signal, or the like, e.g., the type (data type) of input information data or an input signal, is described. In the output item of the service description file, information concerning an output method is described, for example, information indicating how to process information data or a signal designated by the input item when it is input and in which format it is output. In the condition of the service description file, for example, the current state of an appliance which provides the corresponding service is described.

In the service description file shown in FIG. 5, the service provided from the appliance TE2 (TV set) is described. In the input item, "message" is described, and in the output item, "displayable" is described. This indicates that "a message is received as an input, and displayed as an output". In the condition, "power (on)" is described. This indicates that the power supply of the appliance TE2 is ON. If "operated within past 30 min" is described as a condition in the service description file, it indicates that the user was present near the appliance within past 30 min.

If, for example, the power supply of the appliance TE2 is turned off, the state of the appliance TE2 changes. The appliance TE2 then transmits, to the home server 1, a new service description file obtained by rewriting the above condition into the description "power (off)" corresponding to this state. In this manner, every time the state of each of the appliances TE1 to TE9 changes (every time the condition described in a service description file changes), each appliance transmits a service description file in the format shown in FIG. 5 to the home server 1.

Figure 7:
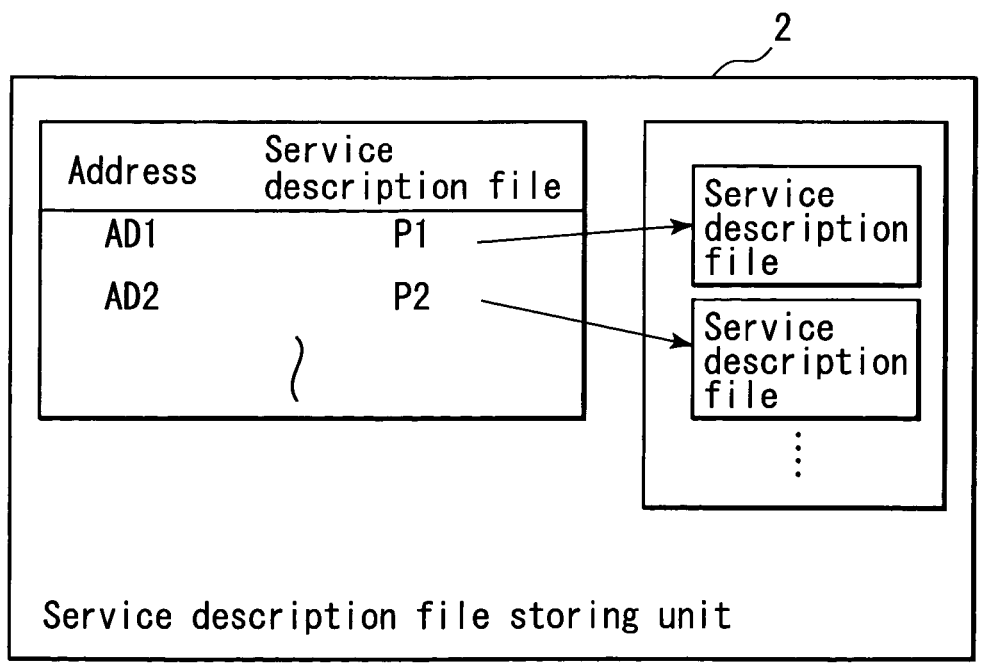
FIG. 7 is a view showing an example of how service description files are stored.

The registration unit 3 of the home server 1 stores the service description files of the respective appliances TE1 to TE9 in the service description file storing unit 2, as shown in FIG. 7. The service description files transmitted from the respective appliances TE1 to TE9 are stored in the service description file storing unit 2 in correspondence with the addresses of the appliances TE1 to TE9. FIG. 7 shows a case wherein the addresses (pointer information) of the storage areas in the service description file storing unit 2 in which the service description files are actually stored, and the addresses of the respective appliances TE1 to TE9 are stored in pairs.

Of the appliances TE1 to TE9, appliances like a TV set, video recorder, and personal computer, i.e., the appliances TE1, TE2, and TE7, have advanced functions, and may have an arrangement like that shown in FIG. 2 so as to also serve as the home server 1.

Referring to back to FIG. 2, the matchmaker unit 11 is constituted by a request input unit 12, function retrieval unit 13, condition retrieval unit 14, vocabulary storing unit 15, retrieval result output unit 16, vocabulary acquiring unit 17, condition converting unit 18, service retrieval requesting unit 19, and adjusting unit 20.

Upon receiving packets including the request service description files transmitted from the appliances TE1 to TE9 on the home network, the first transceiver unit 4 transfers the request service description files to the request input unit 12 of the matchmaker unit 11.

Figure 6:
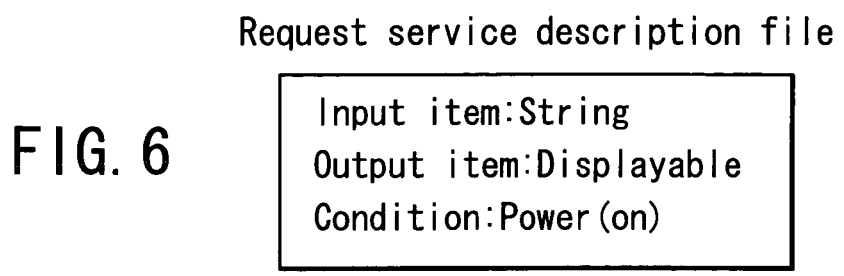
FIG. 6 is a view showing an example of the data format of a request service description file.

Each request service description file has the same format as that of the service description file shown in FIG. 5. That is, as shown in FIG. 6, an input item, output item, and condition are described in each request service description file. In the input item of a request service description file, information designating input information data, an input signal, or the like, e.g., the type (data type) of information data or a signal to be input to a desired service function, is described. In the output item of the request service description file, information concerning an output method of a desired service function is described. In the condition of the request service description file, a condition for the current state of the like of an appliance having the desired service function is described.

The request service description file shown in FIG. 6 as an example is transmitted from the appliance TE8 (printer). In the input item, "string" is described, and in the output item, "displayable". This designates a service function of "receiving a string as an input and displaying it as an output". In the condition, "power (on)" is described. This designates that the power supply is ON with respect to the remote appliance. In the condition of the request service description file, information for designating the state of the remote appliance is described as in the case of the condition of a service description file.

The function retrieval unit 13 retrieves a service function semantically identical or similar to the service function described in a request service description file. More specifically, the function retrieval unit 13 obtains words identical or similar to the words described in the input and output items of the request service description file. The function retrieval unit 13 activates the vocabulary acquiring unit 17. The vocabulary acquiring unit 17 obtains words identical or similar to the words described in the input and output items of the request service description file from the words stored in the vocabulary storing unit 15, and also obtains the similarities between the obtained words and those described in the input and output items. The vocabulary acquiring unit 17 transfers only words exhibiting similarities equal to or higher than a predetermined threshold to the function retrieval unit 13.

Figure 8:
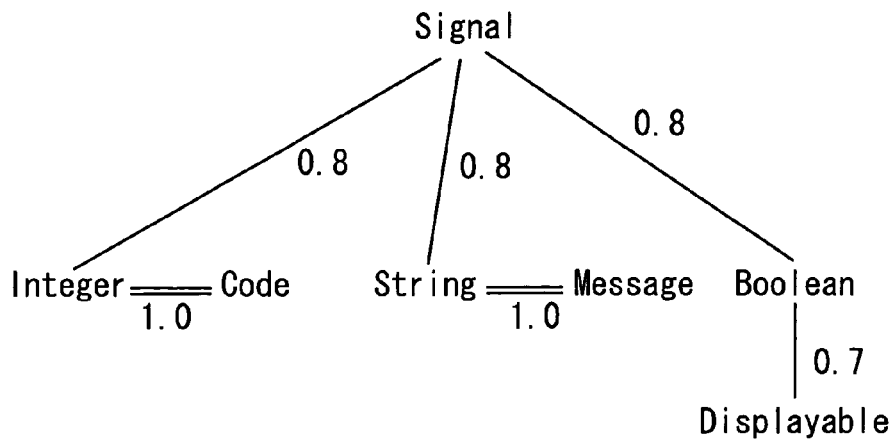
FIG. 8 is a view showing an example of an ontology stored in a vocabulary storing unit.

The vocabulary storing unit 15 stores an ontology which expresses, in the form of a graph, a plurality of words and the correlation between the plurality of words on the basis of their meanings. FIG. 8 shows an example of the ontology stored in the vocabulary storing unit 15. In the vocabulary storing unit 15, the respective words expressed by nodes, and correlative words are connected through a branch. In correspondence with each branch, the similarity between words is stored.

For example, as shown in FIG. 8, the words "integer", "string", and "boolean" are connected as child nodes to the word "signal". For example, the similarity between the words "signal" and "integer" is associated with the branch that connects these words. The same applies between the words "signal" and "string" and between the words "signal" and "boolean". Words having the same meaning are expressed on the same level (the same layer).

As shown in FIG. 8, since the words "integer" and "code" are identical to each other, the two words are on the same level, and expressed as one node when viewed from the word "signal" as a parent node. Referring to FIG. 8, the branch that connects identical words is expressed by a double line.

Assume that one of a plurality of nodes constituting an ontology is regarded as a base node. The vocabulary acquiring unit 17 sets the words respectively described in the input and output items of a request service description file as words at the base node, and searches the ontology for words identical or similar to the words at the base node. In general, a word at a node (parent node or the like) located upstream of the base node may extend the meaning included in a word at the base node. On the other hand, a word at a node (child node or the like) located downstream of the base node may limit the meaning included in a word at the base node. For the sake of simplicity, assume that the vocabulary acquiring unit 17 searches the base node and nodes located on the same level as that of the base node or located downstream thereof for words. A retrieval condition designates in which direction and to which degree nodes are traced. This retrieval condition is designated by the user or an appliance.

The simplest one of the methods of calculating the similarity (the distance in the ontology) between a word at a base node and a word located downstream thereof will be described. The method to be used in this embodiment is not limited to this method. As the similarity between words at child nodes directly connected to the base node, the similarity associated with the branch that connects the base node to the child node is used without any change. The similarity between a word at the base node and a word at a child node of the child node (a grandchild node from the viewpoint of the base node) decreases in proportion to the distance between the nodes. That is, since the nodes are spaced apart from each other by two generations, the value obtained by multiplying the similarities associated with the two branches that connect the nodes is set as the similarity between the base node and the grandchild node. Likewise, the value obtained by multiplying the similarities associated with the three branches that connect the base node and a great-grandchild node is set as the similarity between the nodes.

As described above, as a node is spaced apart from a base node in the downstream direction (as a node is separated from a base node in generation), a similarity with a word at the base node decreases. Assume that the similarity between "signal" and its child node "boolean" is "0.8", and that between "boolean" and its child node "displayable" is "0.7". Since "signal" is spaced apart from "displayable" by two nodes, the result obtained by multiplying the similarities associated with the two branches that connect them is set as a similarity between "signal" and "displayable". That is, 0.8×0.7=0.56.

The vocabulary acquiring unit 17 sets the word described in the input item of a request service description file at a base node in the ontology tree, and obtains a word (including the word in the input item) having a meaning identical or similar to the meaning of the word in the input item (exhibiting a similarity equal to or higher than a predetermined threshold). Data sets are then obtained, each of which is constituted by each of the obtained words and the similarity with the word in the input item. If there are a plurality of input items, the vocabulary acquiring unit 17 obtains such data sets equal in number to the words in the input items.

In other words, the vocabulary acquiring unit 17 obtains data sets each constituted by a node (word) within a predetermined distance from a node corresponding to the word in an input item and a similarity therewith.

In this case, the above set obtained with respect to one word described in such an input item will be referred to as an "input item word set".

Likewise, the vocabulary acquiring unit 17 sets the word described in the output item of a request service description file at a base node in the ontology tree, and obtains a word (including the word in the output item) having a meaning identical or similar to the meaning of the word in the output item (exhibiting a similarity equal to or higher than a predetermined threshold). Data sets are then obtained, each of which is constituted by each of the obtained words and the similarity with the word in the output item. If there are a plurality of output items, the vocabulary acquiring unit 17 obtains such data sets equal in number to the words in the output items.

In other words, the vocabulary acquiring unit 17 obtains data sets each constituted by a node (word) within a predetermined distance from a node corresponding to the word in an output item and a similarity therewith.

In this case, the above set obtained with respect to one word described in such an output item will be referred to as an "output item word set".

The function retrieval unit 13 obtains a plurality of service description files, from the service description files stored in the service description file storing unit 2, each of which has any one of the words in the input item word sets as the word in the input item, and also has any one of the words in the output items as the word in the output item. The function retrieval unit 13 then calculates the service similarities between a plurality of (or one) service description files and the request service description file.

For example, a service similarity is obtained in the following manner. The simplest method for this operation will be described as an example. It is checked whether there is any word in the input item of a service description file which coincides with the input item word set (of the request service description file) obtained by the vocabulary acquiring unit 17. If there is such a word, the similarity assigned to the word is acquired. The sum of this similarity and the similarity between the word in the output item of the service description file (one of the words in the output item word sets obtained by the vocabulary acquiring unit 17) and the word in the output item of the request service description file is set as the similarity between the service description file and the request service description file. The sum is regarded as a service similarity. The plurality of service description files obtained by the function retrieval unit 13 in this manner are transferred as retrieval result candidates to the condition retrieval unit 14.

The condition retrieval unit 14 calculates the similarities (condition similarities) between the expressions of the conditions in the plurality of service description files as the retrieval result candidates obtained by the function retrieval unit 13 and the expression of the condition in the request service description file.

Figure 9:
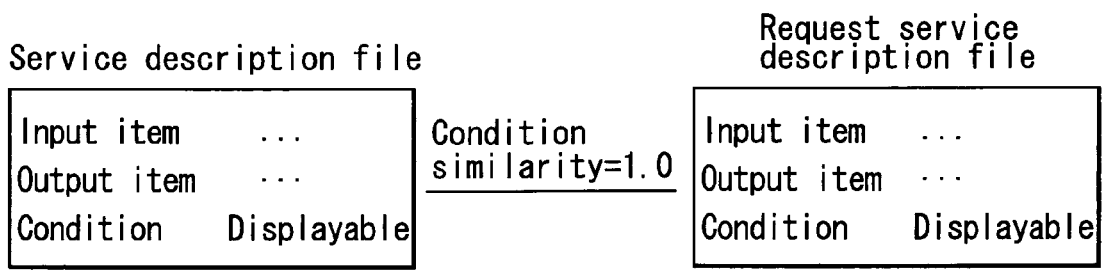
FIG. 9 is a view for explaining a method of calculating a condition similarity.

The simplest example of a condition similarity calculation method will be described with reference to the flow chart of FIG. 15. Assume that the expression (to be referred to as AR) described in the condition in a request service description file is "displayable" (step S111), as shown in FIG. 9. Assume also that the expression (to be referred to as BR) described in the condition in a service description file which is one of retrieval result candidates is "displayable" (steps S112 and S113). In this case, since the two expressions coincide with each other (step S114), the condition similarity is the maximum value "1.0" (step S115).

Figure 10:
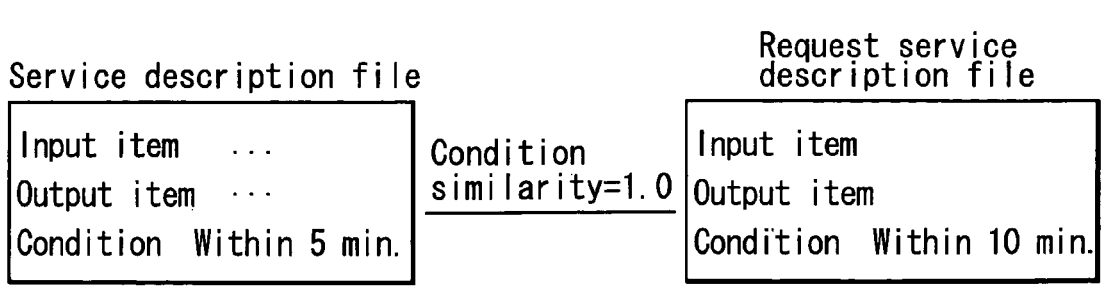
FIG. 10 is a view for explaining a method of calculating a condition similarity.

Another example of the condition similarity calculation method will be described with reference to the flow chart of FIG. 15. In this case, a condition similarity is calculated by a technique of determining the semantic difference between words and the inclusive relationship between conditions. Therefore, similarity and condition inclusive relationship are not treated as different. Assume that the expression (AR) described in the condition in a request service description file is "within 10 min", as shown in FIG. 10 (step S111). Assume also that the expression (BR) described in the condition in a service description file as one of retrieval candidates is "within 5 min" (step S113). In this case, since a time within 5 min always falls within 10 min, the two expressions are regarded as semantically identical (step S114), and the condition similarity is set to the maximum value "1.0" (step S115).

In this embodiment, since the scenes in which the respective appliances TE1 to TE9 are used are limited within the home network, the types of expressions described in the conditions in service description files and request service description files are limited to some extent. Within this limited number of expressions, rules that express the correlations among the respective expressions on the basis of their meanings can be determined in advance. Letting XA and XB be two arbitrary expressions of a plurality of expressions, such a rule can, for example, be expressed by a combination of two expressions having the relationship "if XA, then XB". FIG. 11 shows an example of a list of rules among a plurality of expressions described in conditions. Assume that there are two rules stating that if "there is operation log recorded within 3 min", then "user is present nearby", and if "user is present nearby", then "emergency contact can be reached". In this case, if the condition in a request service description file is "emergency contact can be reached", the expressions "user is present nearby" and "there is operation log recorded within 3 min" are regarded identical to the condition "emergency contact can be reached", the condition similarity is then set to the maximum value "1.0".

Assume that there are expressions XA, XB, and XC, and rules stating that "if XA, then XB" and "if XB, then XC". In this case, since "if XA, then XC", "XA" and "XC" are regarded identical. Although "XA" and "XB" can be determined as identical expressions according to one rule, "XA" and "XC" cannot be determined as identical expressions without using the two rules. Therefore, the semantic distance (similarity) between "XA" and "XB" is shorter than that between "XA" and "XC". That is, the latter pair can be regarded as expressions the similarity between which is lower. When two expressions are regarded identical, the similarity between the two expressions may be obtained in accordance with the number of rules required for one of the two expressions to reach the other expression. If, for example, the two expressions can be determined as identical according to only one rule, the similarity is set to "1.0". If the two expressions can be determined as identical according to two rules, the similarity is set to "0.9". In this manner, the similarity is decreased as the number of rules increases.

A list like the one shown in FIG. 11 is stored in the vocabulary storing unit 15. A method of calculating condition similarities using the list shown in FIG. 11 will be described with reference to the flow chart of FIG. 15. The expression (to be simply referred to as "AR") described in the condition in a request service description file and the expression (to be simply referred to as "BR") described in the condition in one of a plurality of service description files obtained as retrieval result candidates include no numerical range such as time ranges. Coincidence/incoincidence determination cannot therefore be performed in step S114 (steps S111 to S114). For this reason, the condition retrieval unit 14 activates the condition converting unit 18, and transfers the expression (to be simply referred as "AR") described in the condition in the request service description file and the expression (to be simply referred to as "BR") described in the condition in one of the plurality of service description files obtained as retrieval result candidates to the condition converting unit 18.

The condition converting unit 18 checks whether BR is reached from AR in the list shown in FIG. 11 considering AR as a base point (i.e., whether AR can be converted into BR). The condition converting unit 18 also checks whether AR is reached from BR in the list shown in FIG. 11 considering BR as a base point (i.e., whether BR can be converted into AR). If conversion can be performed from any one of AR and BR to the other, the condition retrieval unit 14 regards them as identical (step S116), and gives "1.0" as a condition similarity (step S117). If conversion cannot be performed from any one of AR and BR to the other, the condition retrieval unit 14 regards them as nonidentical (step S116), and sets the condition similarity to a value near "0", e.g., "0.1" (step S118).

The condition retrieval unit 14 calculates condition similarities with respect to all service description files as retrieval result candidates as in steps S114 to S118 (step S119).

The condition retrieval unit 14 may narrow down the number of retrieval result candidates by deleting files of the service description files obtained as retrieval results by function retrieval which exhibit condition similarities equal to or lower than a predetermined threshold. The condition retrieval unit 14 obtains the product of a service similarity and a condition similarity with respect to each service description file as a retrieval result candidate. This product is set as the priority of the service description file. A list of the respective service description files as retrieval result candidates whose priorities have been calculated and the addresses of appliances corresponding to the respective service description files is transferred to the retrieval result output unit 16.

The retrieval result output unit 16 sorts the service description files in descending order of priority. The retrieval result output unit 16 then outputs a list including service description files, the addresses of appliances, and priorities, like the one shown in FIG. 12, to the first transceiver unit 4. The priorities are numbers sequentially assigned in descending order of priority. The highest priority is "1". The first transceiver unit 4 transmits packets containing the list to the appliance as the transmission source (request source) on the home network which has sent the request service description file. Note that a list of retrieval results may include at least the addresses of appliances and priorities.

The first transceiver unit 4 measures a response time from the instant at which packets are transmitted to an appliance on the home network to the instant at which the corresponding acknowledgement is received. The second transceiver unit 5 measures a response time from the instant at which packets are transmitted to an appliance on the Internet to the instant at which the corresponding acknowledgement is received.

The adjusting unit 20 adjusts the data amount of a list to be transmitted as a retrieval result in accordance with a bandwidth useable for communication with the first and second transceiver units 4 and 5. If, for example, the above response times measured by the first and second transceiver units 4 and 5 are equal to or more than predetermined times, the adjusting unit 20 outputs control signals to the function retrieval unit 13, condition retrieval unit 14, and retrieval result output unit 16 to reduce the data amount of retrieval result list.

Upon receiving a control signal from the adjusting unit 20, the retrieval result output unit 16 reduces the number of retrieval results or the data amount of service description files in the list. For example, the retrieval result output unit 16 deletes a service description file itself from the list. Alternatively, the retrieval result output unit 16 deletes part of a service description file in the list, or deletes a service description file with the lowest priority.

Upon receiving a control signal from the adjusting unit 20, the function retrieval unit 13 increases the similarity threshold (the maximum distance in the ontology) for the words acquired by the vocabulary acquiring unit 17 to decrease the number of words included in each of the input item word set and the output item words set. A service description file whose service similarity is less than a predetermined threshold is deleted from retrieval result candidates. The above two operations may be simultaneously performed.

Upon receiving a control signal from the adjusting unit 20, the condition retrieval unit 14 deletes a service description file whose condition similarity is less than a predetermined threshold from retrieval result candidates. Alternatively, the condition retrieval unit 14 deletes a service description file whose priority is less than a predetermined threshold from retrieval result candidates. The above two operations may be simultaneously performed.

Figure 3:
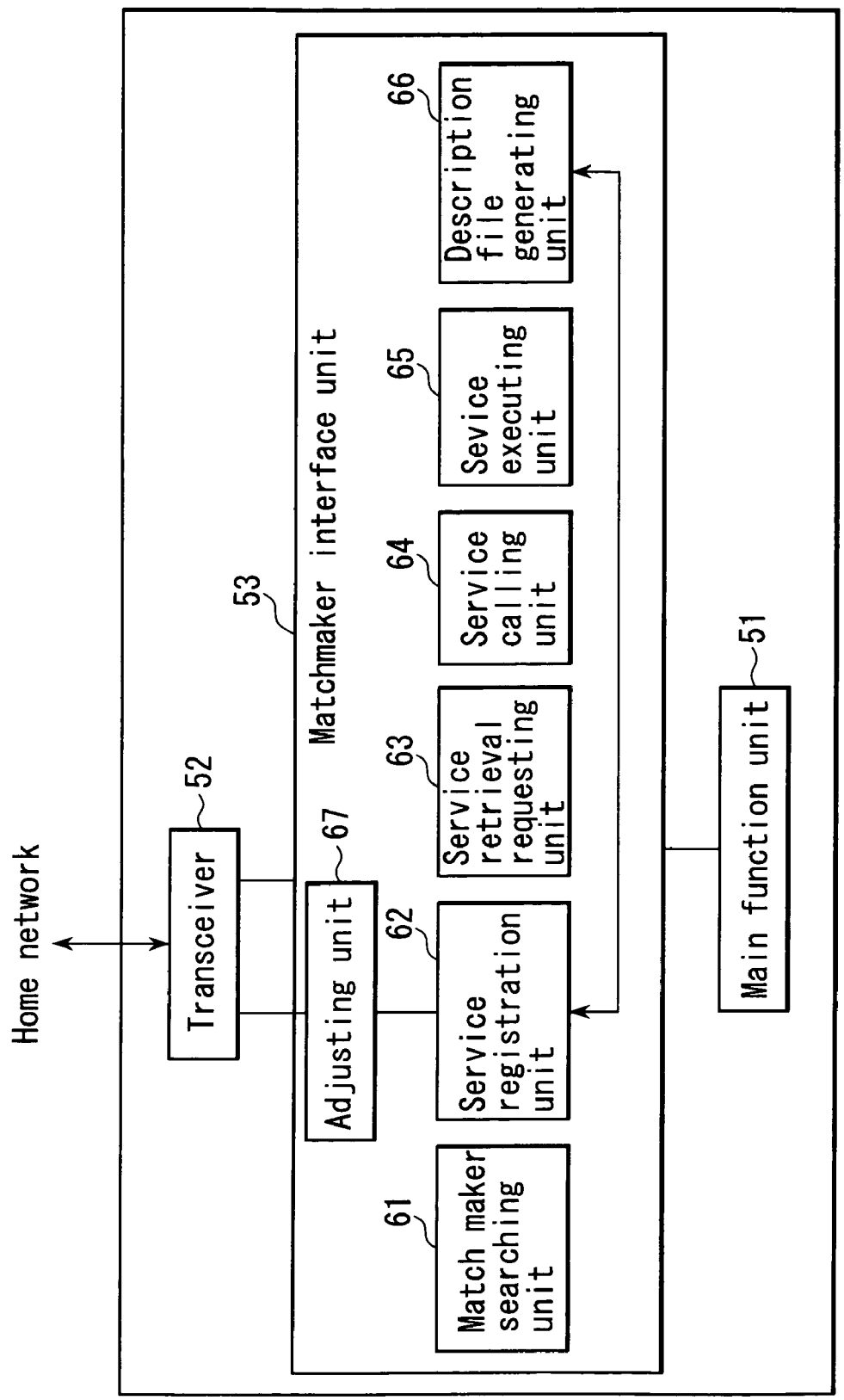
FIG. 3 is a block diagram showing an example of the arrangement of an appliance.
Figure 4:
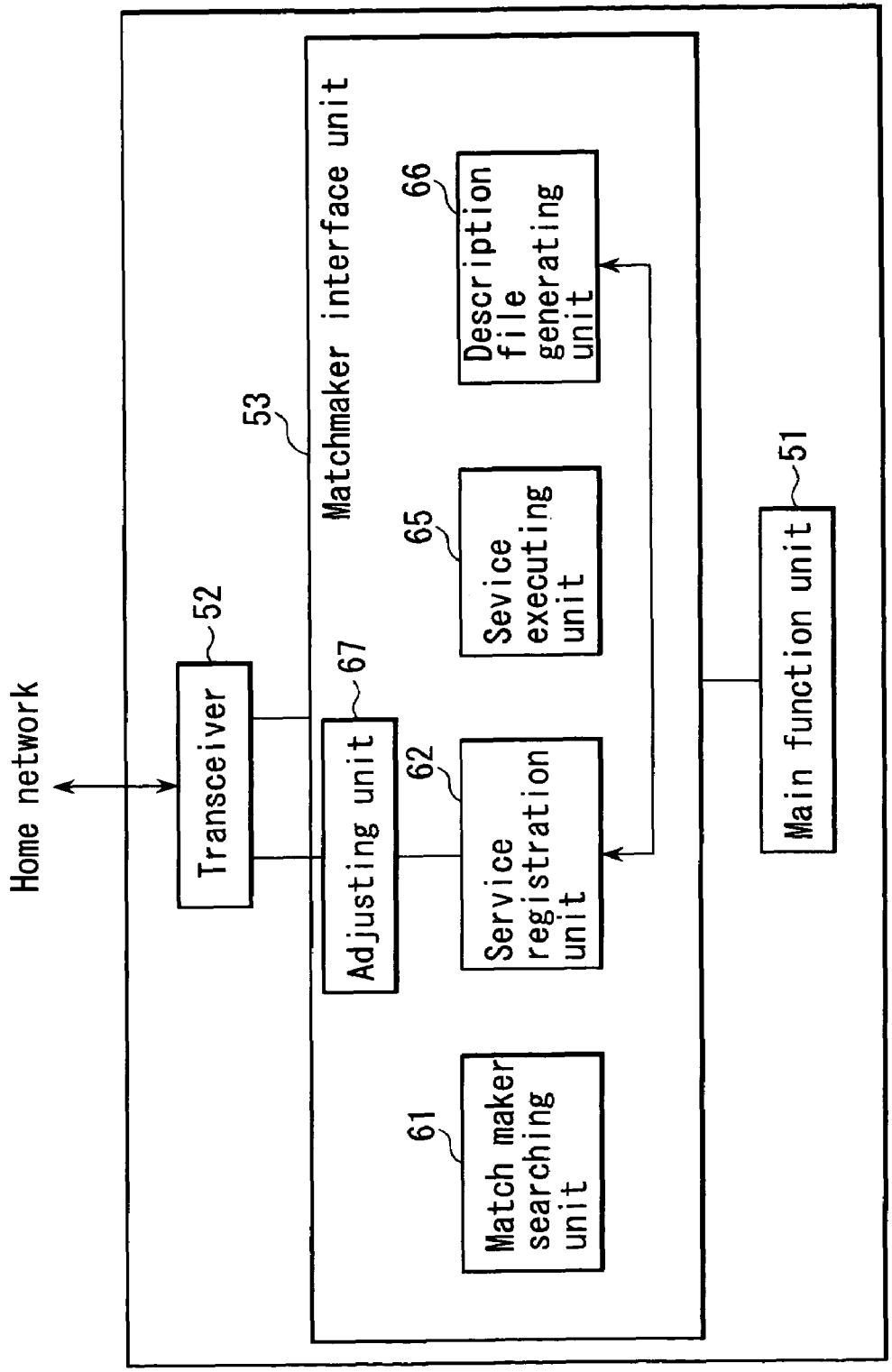
FIG. 4 is a block diagram showing another example of the arrangement of the appliance.

The arrangement each of the appliances TE1 to TE9 on the home network will be described with reference to FIGS. 3 and 4. FIG. 3 shows an example of the arrangement of an appliance of the appliances TE1 to TE9 which has a service request function. FIG. 4 shows an example of the arrangement of an appliance having no service request function. The appliance shown in FIG. 3 is roughly constituted by a main function unit 51, matchmaker interface unit 53, and transceiver 52. The main function unit 51 implements a function unique to the appliance. The transceiver 52 serves to transmit/receive various kinds of packets through the home network.

The matchmaker interface unit 53 is constituted by a matchmaker searching unit 61, service registration unit 62, service retrieval requesting unit 63, service calling unit 64, service executing unit 65, description file generating unit 66, and adjusting unit 67. When the appliance is connected to the home network, the matchmaker searching unit 61 generates packets (matchmaker search packets) for searching for the matchmaker on the home network. The description file generating unit 66 monitors the state of the second transceiver unit 5, and generates a service description file every time the state changes. The description file generating unit 66 stores in advance a service description file in which input and output items are described in advance, and describes a new condition in the condition in the description file every time the state of the main function unit 51 changes, thereby generating a new service description file. Every time a new service description file is generated, the service registration unit 62 generates packets containing the service description file.

The service retrieval requesting unit 63 generates a request service description packet. The service calling unit 64 generates a packet (service calling packet) for requesting the execution of a service to an appliance corresponding to the service description file selected from the retrieval result list sent from the matchmaker. Upon receiving the service calling packet transmitted from another appliance, the service executing unit 65 transfers to the main function unit 51, the data, signal, or the like contained in the packet and transmitted from the another appliance, and starts executing the service function.

The arrangement shown in FIG. 4 is equivalent to the arrangement shown in FIG. 3 from which the service retrieval requesting unit 63 as a service requesting function and the service calling unit 64 are omitted.

As described above, the matchmaker unit 11 retrieves a service description file in which a service (input and output items) and condition which are semantically identical or similar to those described in a request service description file are described.

Figure 13:
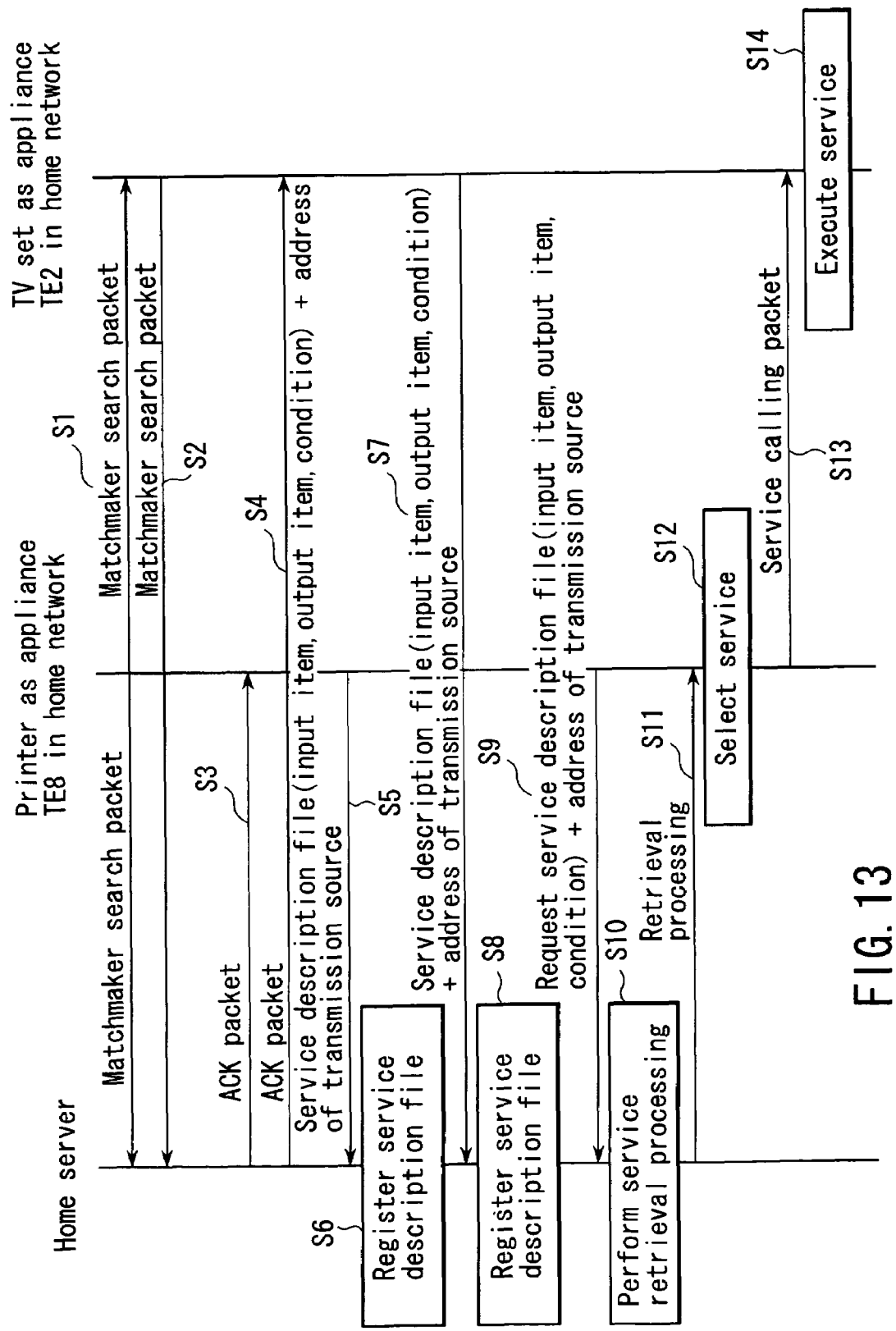
FIG. 13 is a flow chart for explaining the processing operation of the system shown in FIG. 1.

Processing operation between the appliances TE1 to TE9 and the home server will be described next with reference to the flow chart of FIG. 13. The case wherein the printer as the appliance TE8 serving as a service request source submits a service request to the TV set as the appliance TE2 will be exemplified. Consider a case wherein if an error such as paper out occurs in the printer when the user is watching TV while causing the printer to perform large-volume printing, the printer outputs a message indicating the error in the printer to the TV set near which the user is expected to be present, instead of outputting the error message to the personal computer connected to the printer.

First of all, when connected to the home network, the printer as the appliance TE8 (to be simply referred to as a printer TE8 hereinafter) broadcasts a matchmaker search packet into the home network to check the presence/absence of a matchmaker and the address of the matchmaker (step S1). When connected to the home network, the TV set as the appliance TE2 (to be simply referred to as a TV TE2 hereinafter) also broadcasts a matchmaker search packet into the home network (step S2). The same applies to the other appliances.

The home server 1 has the matchmaker unit 11. Upon receiving the above matchmaker search makers, therefore, the home server 1 transmits ACK packets each containing the address "AD0" of the home server 1 to the packet transmission sources, respectively (steps S3 and S4). The printer TE8 transmits packets containing the self service description file and the address "AD8" to the home server 1 (step S5). Upon receiving the packets, the home server 1 registers the service description file and the address of the printer TE8 contained in the packets in the service description file storing unit 2 (step S6). Likewise, the TV TE2 transmits packets containing the self service description file and the address "AD2" to the home server 1 (step S7). Upon receiving the packets, the home server 1 registers the service description file and the address of the TV TE2 contained in the packets in the service description file storing unit 2 (step S8). The same applies to the other appliances.

Assume that the above error occurs in the printer TE8. In this case, the printer TE8 transmits, to the home server 1, packets containing a request service description file (input item: string, output item: displayable, condition: user is present nearby) in which a service of "inputting character string and displaying it" and the condition that "user is present nearby" are described and the address "AD8" (step S9). Upon receiving the above request service description file, the home server 1 causes the matchmaker unit 11 to execute service retrieval processing (step S10).

Service retrieval processing will be described with reference to the flow chart of FIG. 14. When the above request service description file is input to the request input unit 12 of the matchmaker unit 11 (step S101), the description file is transferred to the function retrieval unit 13. The function retrieval unit 13 activates the vocabulary acquiring unit 17.

The vocabulary acquiring unit 17 acquires an input item word set corresponding to the word "string" described in the input item of the request service description file. In this case, for example, the vocabulary acquiring unit 17 acquires "string" (similarity "1.0") and "message" (similarity "1.0"). The vocabulary acquiring unit 17 also acquires an output item word set corresponding to the word "displayable" described in the output item of the request service description file. Assume that in this case, for example, the vocabulary acquiring unit 17 acquires only "displayable" (similarity "1.0") (step S102).

The function retrieval unit 13 then obtains, among the service description files stored in the service description file storing unit 2, a plurality of (or one) service description files whose words described in the input items are identical or similar to any word of the input item word set (step S103). The function retrieval unit 13 also obtains, among the above plurality of (or one) service description files, a plurality of (or one) service description files whose words described in the output items are identical or similar to any word of the output item word set (step S104).

In addition to the TV set as the appliance TE2, the cell phone as the appliance TE9, the personal computer as the appliance TE7, and the like have service functions of inputting the character string "string" and displaying it. Therefore, in the service semantic retrieval in steps S102 to S104, the service description files of the appliances TE2, TE9, and TE7 are obtained as retrieval result candidates. The function retrieval unit 13 calculates a service similarity with respect to each service description file.

Figure 15:
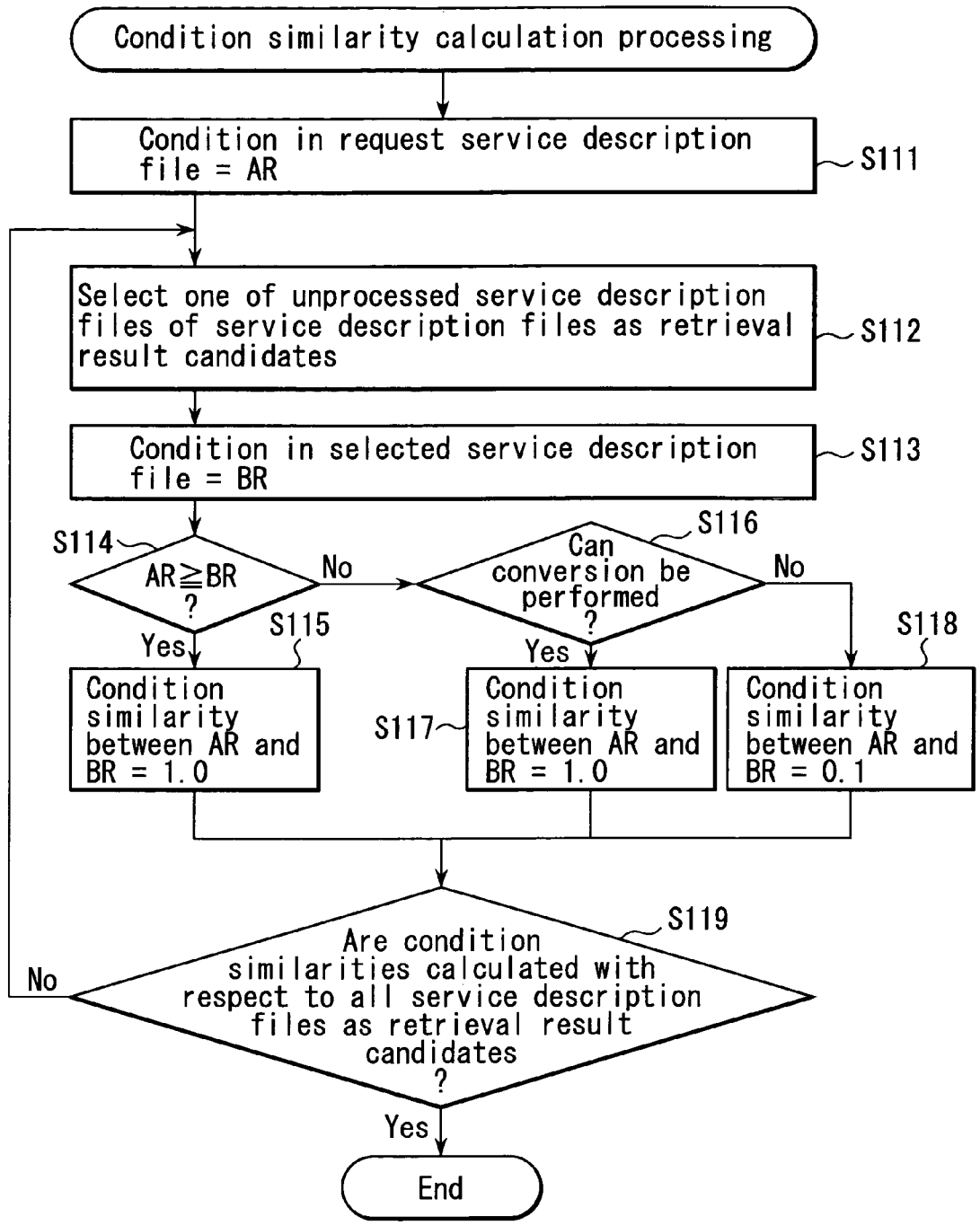
FIG. 15 is a flow chart for explaining condition similarity calculation processing operation.

The condition retrieval unit 14 then calculates the condition similarities between the expressions described in the conditions in the above three service description files and the expression "user is present nearby" described in the condition in the request service description file according to the sequence shown in FIG. 15 (step S105). Assume that of the above three service description files, the condition in the service description file of the TV TE2 is "there is operation log recorded within 3 min", and the conditions in the service description files of the appliances TE7 and TE9 are "power off". In this case, AR is "user is present nearby". If, therefore, "there is operation log recorded within 3 min" is set as BR, conversion from BR to AR can be done (step S116 in FIG. 15), as is obvious from the list shown in FIG. 11. In this case, the condition similarity between AR and BR is "1.0" (step S117). If BR is "power off", since conversion cannot be done (step S116), the condition similarity between AR and BR is a value near "0", e.g., "0.1" (step S118).

Referring back to FIG. 14, the condition retrieval unit 14 obtains the product (priority) of a service similarity and a condition similarity with respect to each service description file as a retrieval result candidate (step S106). Obviously, in this case, the TV TE2 has the highest priority. This retrieval result indicates that the highest priority is assigned to the service description file of the TV set as the appliance TE2, of the plurality of appliances TE2, TE7, and TE9 having the same service function, near which the user is expected to be present.

Referring back to FIG. 13, a list of respective service description files as retrieval result candidates whose priorities have been calculated and the addresses of appliances corresponding to the respective service description files is transferred to the retrieval result output unit 16. The retrieval result output unit 16 transmits the list of service description files and the addresses of appliances, like the one shown in FIG. 12, to the printer TE8 as a request source through the first transceiver unit 4 (step S11).

The printer TE8 selects a service description file with the highest priority from the retrieval result list (step S12). That is, the printer TE8 selects the service description file of the TV TE2. The printer TE8 then transmits a service calling packet containing an error message to the TV TE2 (step S13). Upon receiving the packet, the TV TE2 transfers the error message contained in the packet to the main function unit 51, and displays the error message on the TV screen (step S14).

The above operation is the basic operation in the home network in the system shown in FIG. 1. The above embodiment has exemplified the case wherein only one expression is described in the condition in a request service description file or service description file. However, the present invention is not limited to this, and a plurality of expressions may be described. If there are a plurality of expressions describing conditions, the number of service description files of retrieval result candidates can be further narrowed down.

Second Embodiment

Another processing operation of the system shown in FIG. 1 will be described next. A home server 1 and appliances TE1 to TE9 in a home network can entrust service retrieval processing to a server 100 having a matchmaker unit on the Internet. When, for example, the appliances TE1 and TE2 also serve as the home server 1, the calculation resources are probably small. In addition, each appliance must execute its original function. If such an appliance is to execute the above service retrieval processing, a heavy load is imposed on the appliance. Entrusting service retrieval processing to a server other than a home server, which has a matchmaker unit, is more efficient than making only the home server execute the service retrieval processing.

Figure 21:
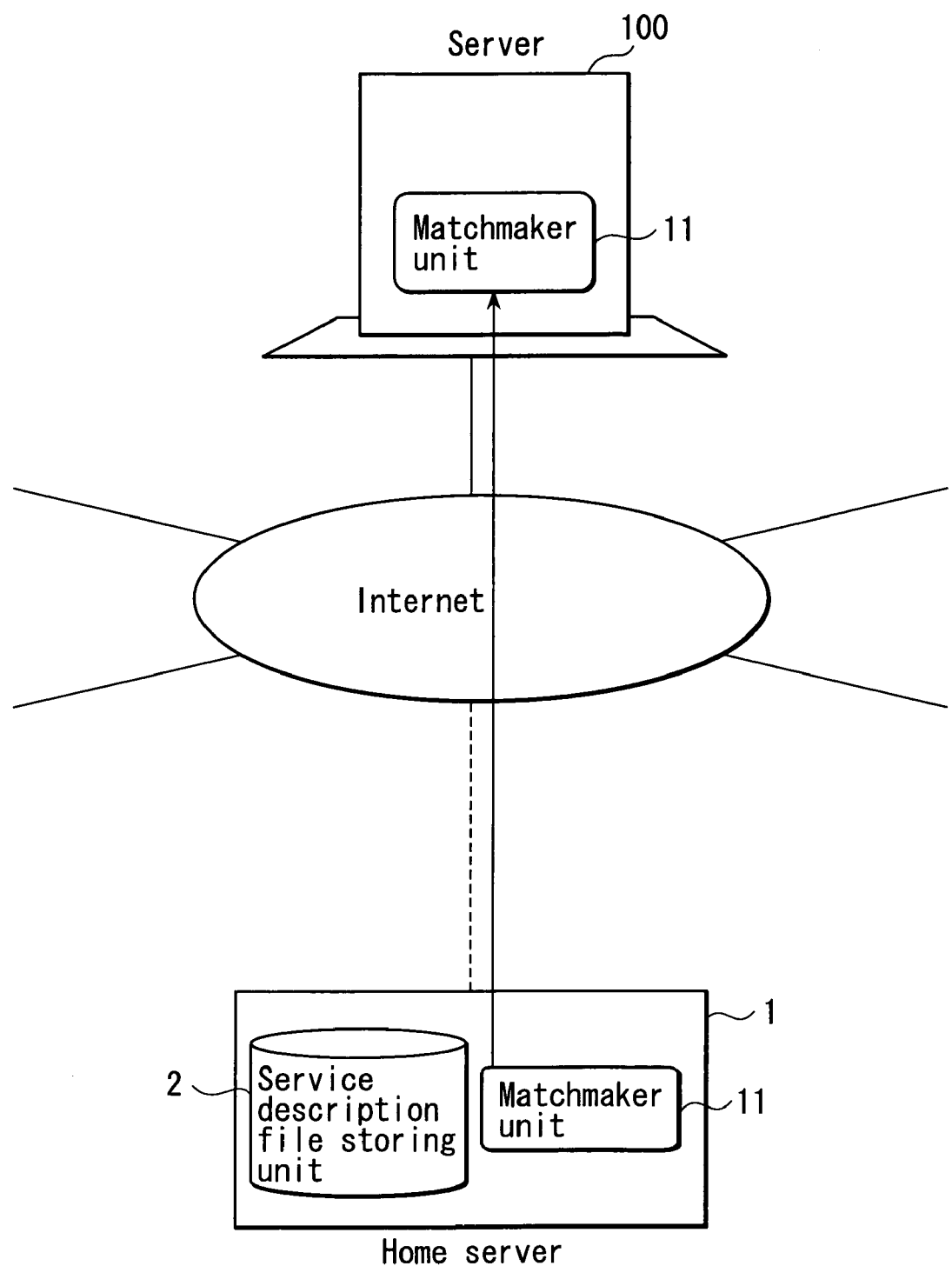
FIG. 21 is a view for explaining still another processing operation in the system shown in FIG. 1.

The server 100 on the Internet performs retrieval processing in the following two cases: in the first case, the server 100 sets, as a retrieval target, service description files stored in a service description file storing unit 2 in the server 100 (see FIG. 16), and in the second case, the server 100 sets, as a retrieval target, service description files stored in a service description file storing unit 2 in the home server 1 (see FIG. 21). Each of the (first case) and (second case) will be described below.

Figure 16:
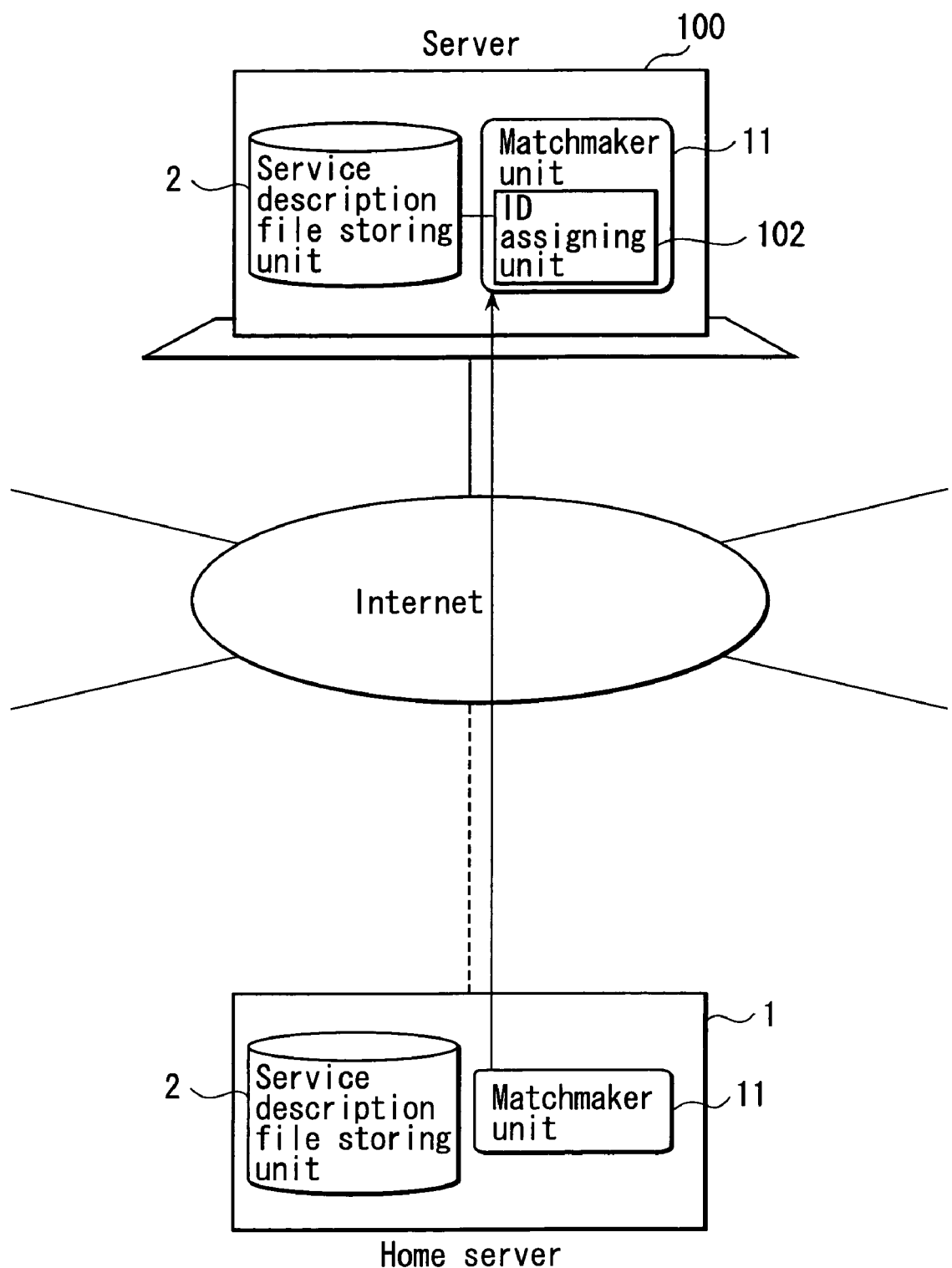
FIG. 16 is a view for explaining another processing operation in the system shown in FIG. 1.

(1) In the first case, the server 100 on the Internet must discriminate countless home servers 1 connected to the Internet. As shown in FIG. 16, therefore, the server 100 has an ID assigning unit 102 for assigning IDs to the respective home servers.

Figure 17:
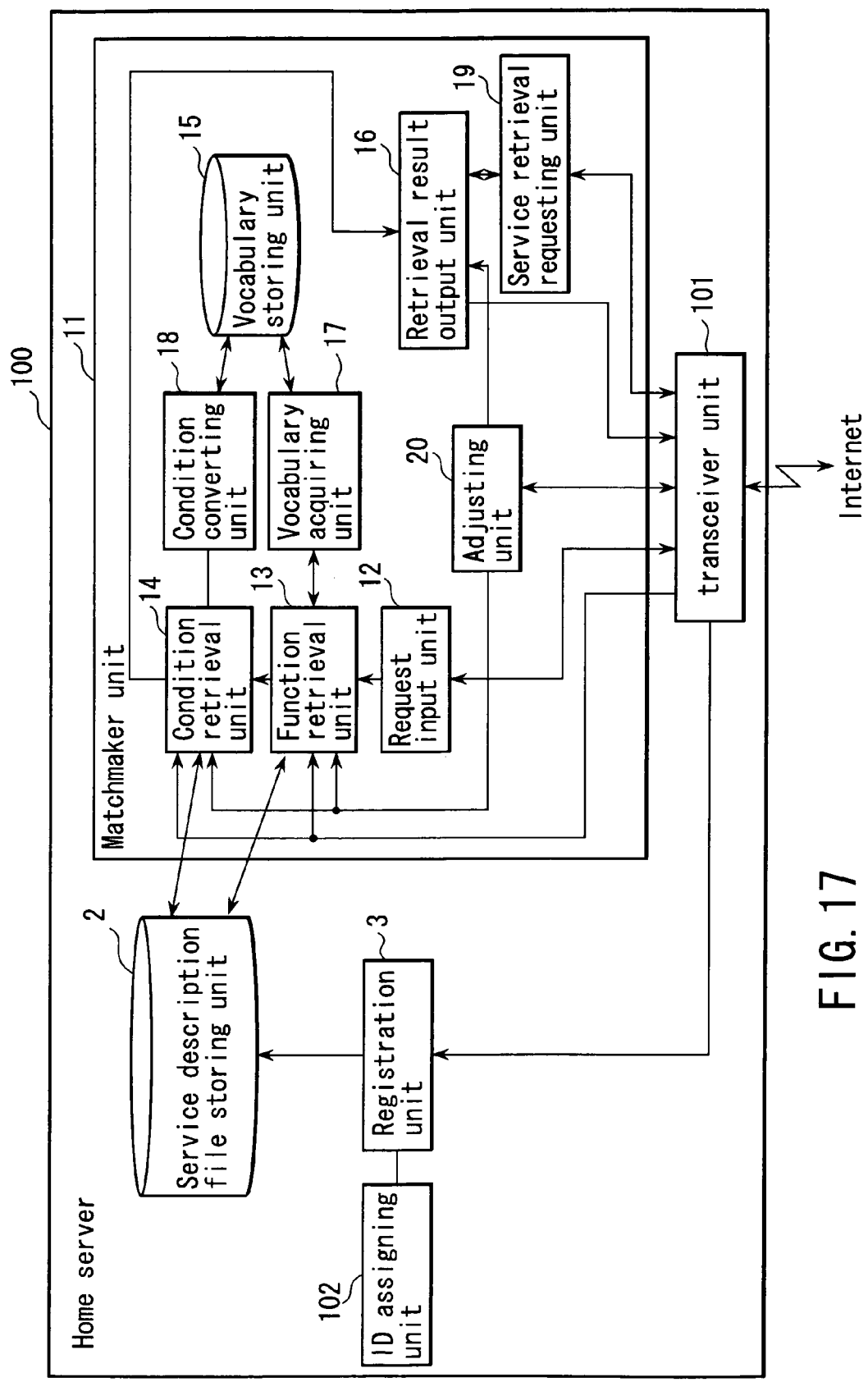
FIG. 17 is a block diagram showing the first arrangement example of a server.

FIG. 17 shows an example of the arrangement (first arrangement example) of the server 100 in FIG. 16. The same reference numerals as in FIG. 2 denote the same parts in FIG. 17, and only different portions will be described. Referring to FIG. 17, the first and second transceiver units 4 and 5 in FIG. 2 are replaced with a transceiver unit 101. In addition, the ID assigning unit 102 is added to the server 100. The transceiver unit 101 transmits/receives various kinds of packets to/from the home server 1 and the appliances TE1 to TE9 (through the home server 1). The ID assigning unit 102 serves to assign one ID to one home server 1. For example, the service description files of the respective appliances TE1 to TE9 under the control of the home server 1 are stored in the service description file storing unit 2 in correspondence with the IDs corresponding to the home servers 1.

Assume that the address "add100" of the server 100 is stored in each of the home server 1 and the appliances TE1 to TE9. When the appliances TE1 to TE9 transmit packets addressed to the server 100, the packets always go through the home server 1. Therefore, the address of the transmission source of the packet is the address of the home server 1 when viewed from the server 100. In addition, in the initial state of the home server 1, the home server 1 and the appliances TE1 to TE9 do not know the IDs assigned to the home servers 1 by the server 100.

The above operation will be described below with reference to FIG. 18. Assume that the server 100 has received packets (containing a service description file and the address of an appliance) transmitted from one of the appliances TE1 to TE9 (e.g., the appliance TE8) (step S21). In this case, if no ID has been assigned to the address of the transmission source of the packets (the address of the home server 1 when viewed from the server 100), the ID assigning unit 102 assigns an ID (e.g., "ID1") to the address of the home server 1. A registration unit 3 stores the service description file and the address of the appliance contained in the received packets in correspondence with the ID (step S22). The server 100 transmits the packets containing the ID assigned to the home server 1 and the address of the appliance TE8 to the home server 1 (step S23). Upon receiving the packets through the home server 1, the appliance TE8 extracts the ID contained in the packets, and stores it (step S24).

Figure 19:
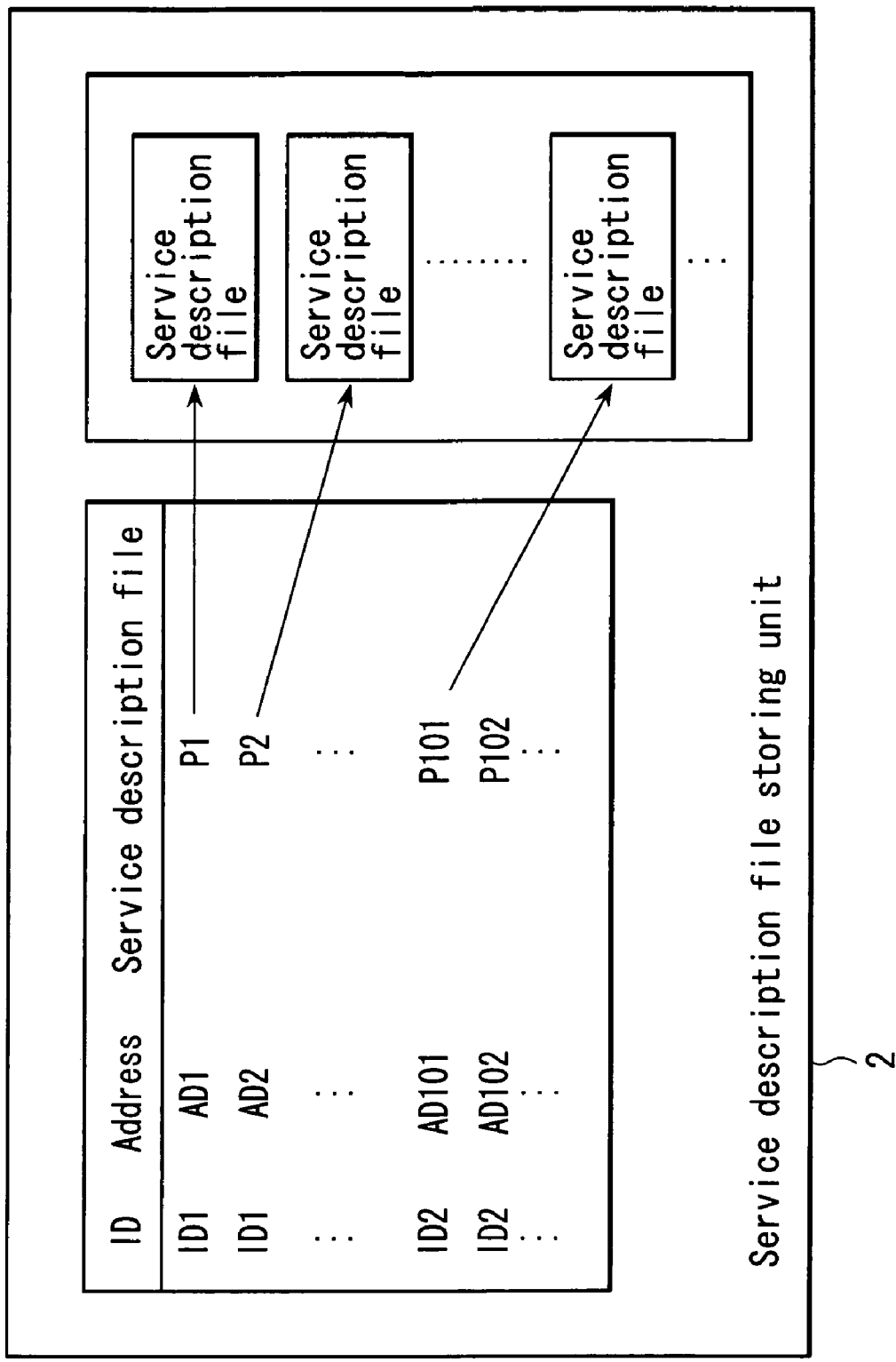
FIG. 19 is a view showing another example of how service description files are stored.

When one (e.g., the appliance TE2) of the appliances TE1 to TE9 which does not know the ID of the home server 1 transmits packets containing a service description file and the address of the appliance to the server 100 (step S25), the server 100 stores the service description file contained in the packets, together with the ID corresponding to the home server 1, as shown in FIG. 19 (step S26). The server 100 then transmits the packets containing the ID of the home server 1 and the address of the appliance TE2 to the home server 1 (step S27). Upon receiving the packets through the home server 1, the appliance TE2 extracts the ID contained in the packets and stores it (step S28).

Subsequently, one (e.g., the appliance TE8) of the appliances TE1 to TE9 in which the ID ("ID1") of the home server 1 is stored transmits a packets containing a request service description file, the ID ("ID1") of the home server 1, and the address of the appliance TE8 (step S29). Upon receiving the packets, the server 100 performs service retrieval processing as shown in FIG. 14 with respect to only a service description file as a retrieval target (of an appliance under the control of the home server 1), of the service description files stored in the service description file storing unit 2 of the server 100, which is stored in correspondence with the ID "ID1" of the home server 1 (step S30). The subsequent processing (steps S31 to S34) is the same as that in steps S11 to S14 in FIG. 13.

Figure 18:
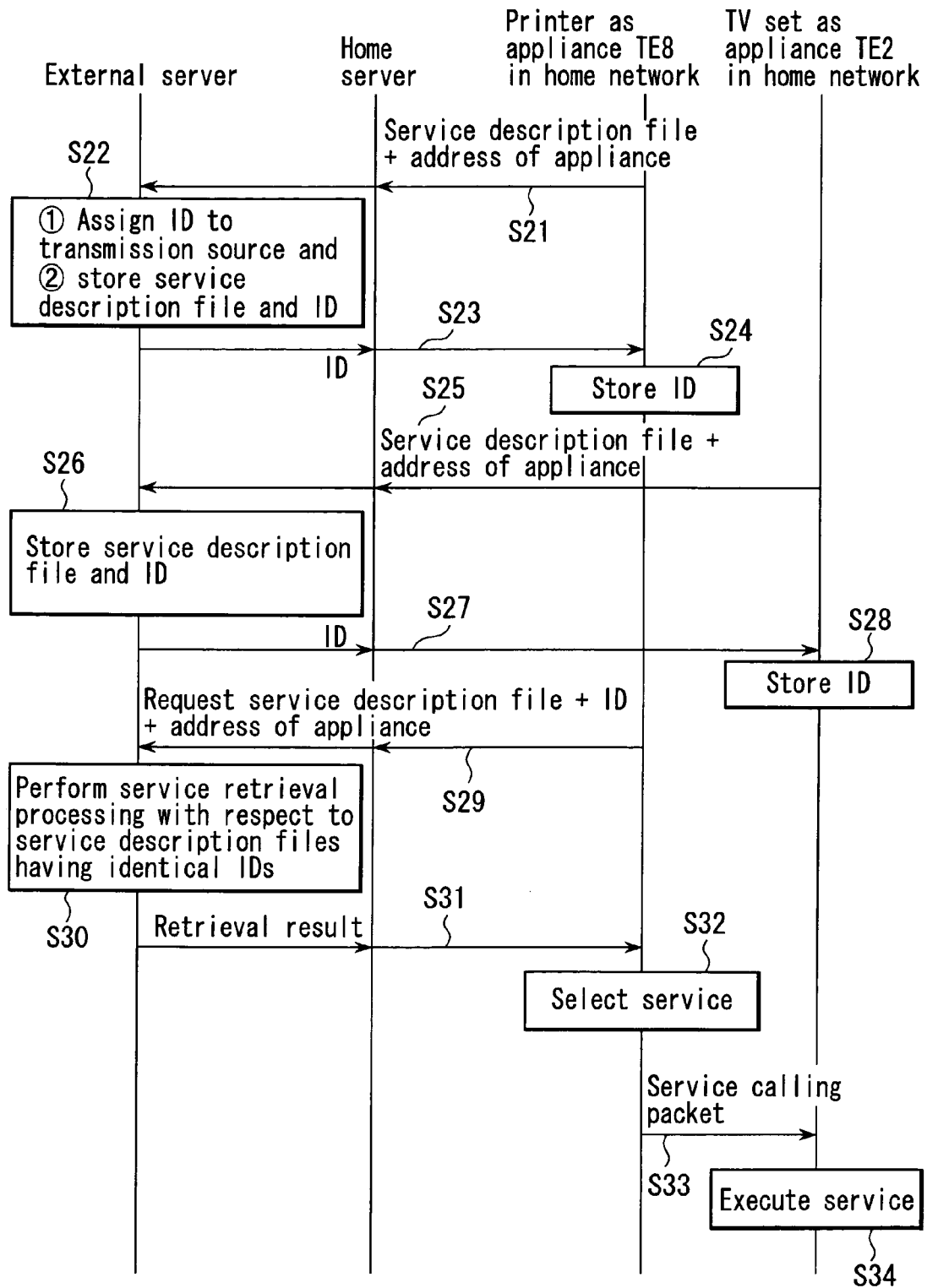
FIG. 18 is a flow chart for explaining another processing operation in the system.

FIG. 18 shows the case wherein an ID is assigned to the home server 1 by making one of the appliances TE1 to TE9 connected to the home server 1 transmit a packet (steps S21 to S28 in FIG. 18). However, the present invention is not limited to this case. The home server 1 may transmit a packet to the server 100 to acquire an ID, and the server 100 may assign an ID to the home server 1. The ID assigned to the home server 1 is transmitted from the server 100 to the home server 1. The home server 1 broadcasts a packet containing the received ID into the home network to notify each of the appliances TE1 to TE9 of the ID. Each of the appliances TE1 to TE9 extracts the ID from the received packet and stores it. The subsequent processing operation (steps S29 to S34 in FIG. 18) is the same as that described above.

Figure 20:
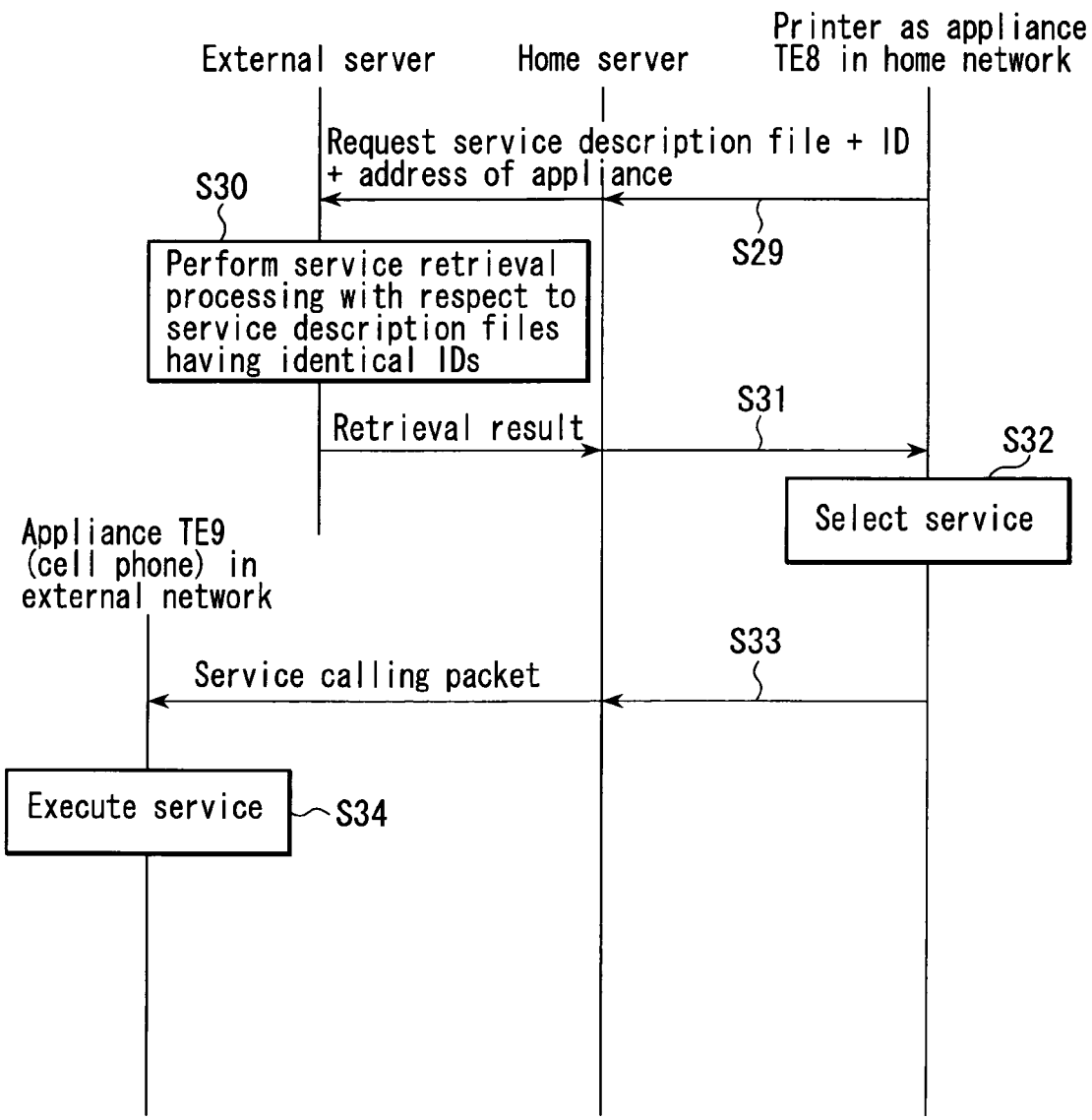
FIG. 20 is a flow chart for explaining still another processing operation in the system.

Of the appliances TE1 to TE9, the cell phone as the appliance TE9 does not always exist in the home network. If, for example, the printer as the appliance TE8 selects the cell phone as the appliance TE9 in step S32 as shown in FIG. 20, a service calling packet to the appliance TE9 is transmitted from the home server 1 to the appliance TE9 through the Internet (step S33).

Figure 22:
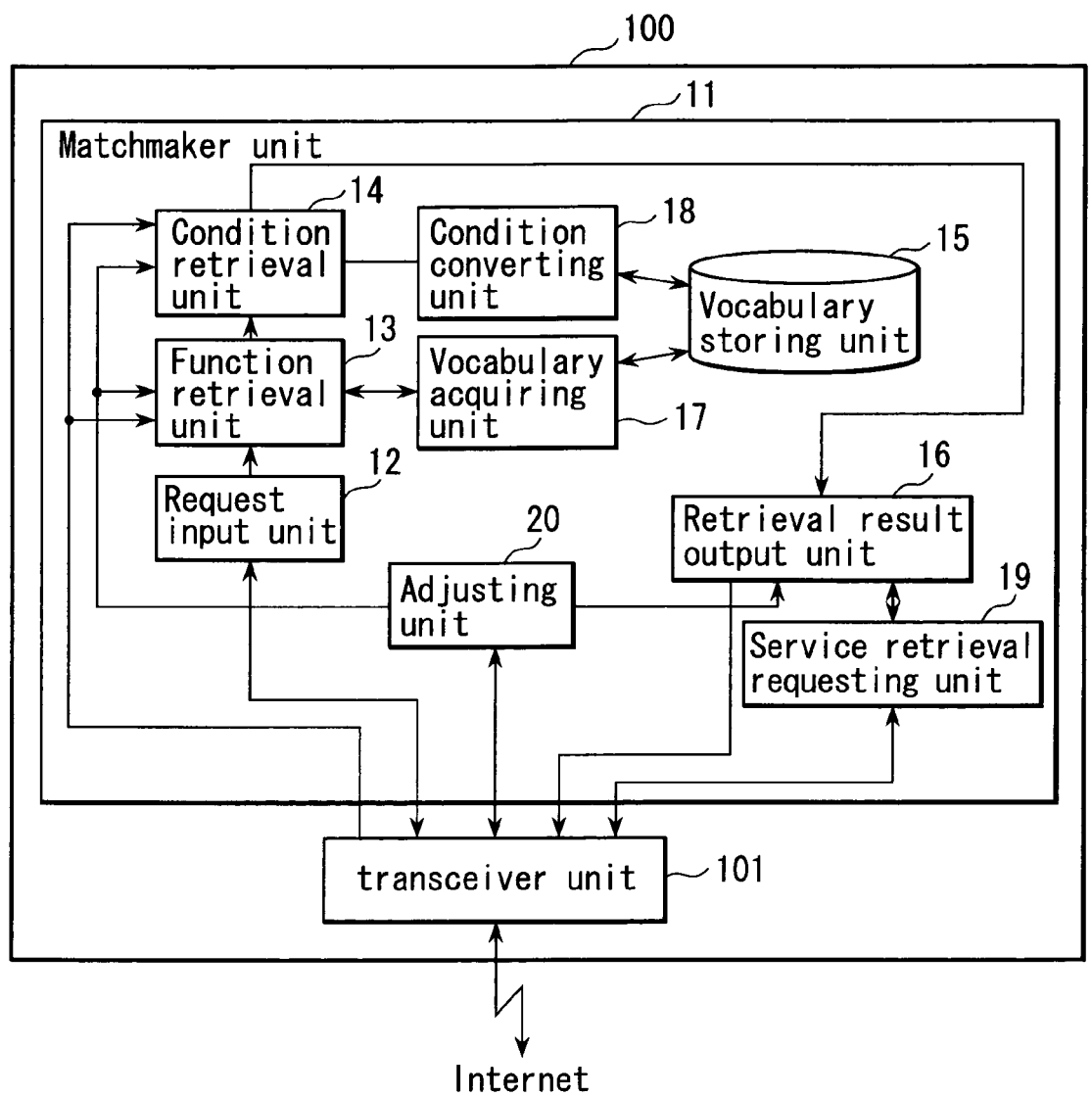
FIG. 22 is a block diagram showing the second arrangement example of the server.

(2) In the second case, the server 100 need not necessarily have the service description file storing unit 2. The server 100 may have an arrangement like the one shown in FIG. 22 (second arrangement example). Obviously, the server 100 may have an arrangement like the one shown in FIG. 17. The same reference numerals as in FIG. 17 denote the same parts in FIG. 22, and only different portions will be described. In the arrangement shown in FIG. 22, the service description file storing unit 2, registration unit 3, and ID assigning unit 102 are omitted.

Assume that each home server 1 stores the address "add100" of the server 100. There is no need to register the service description files of the respective appliances TE1 to TE9 in the server 100.

Figure 23:
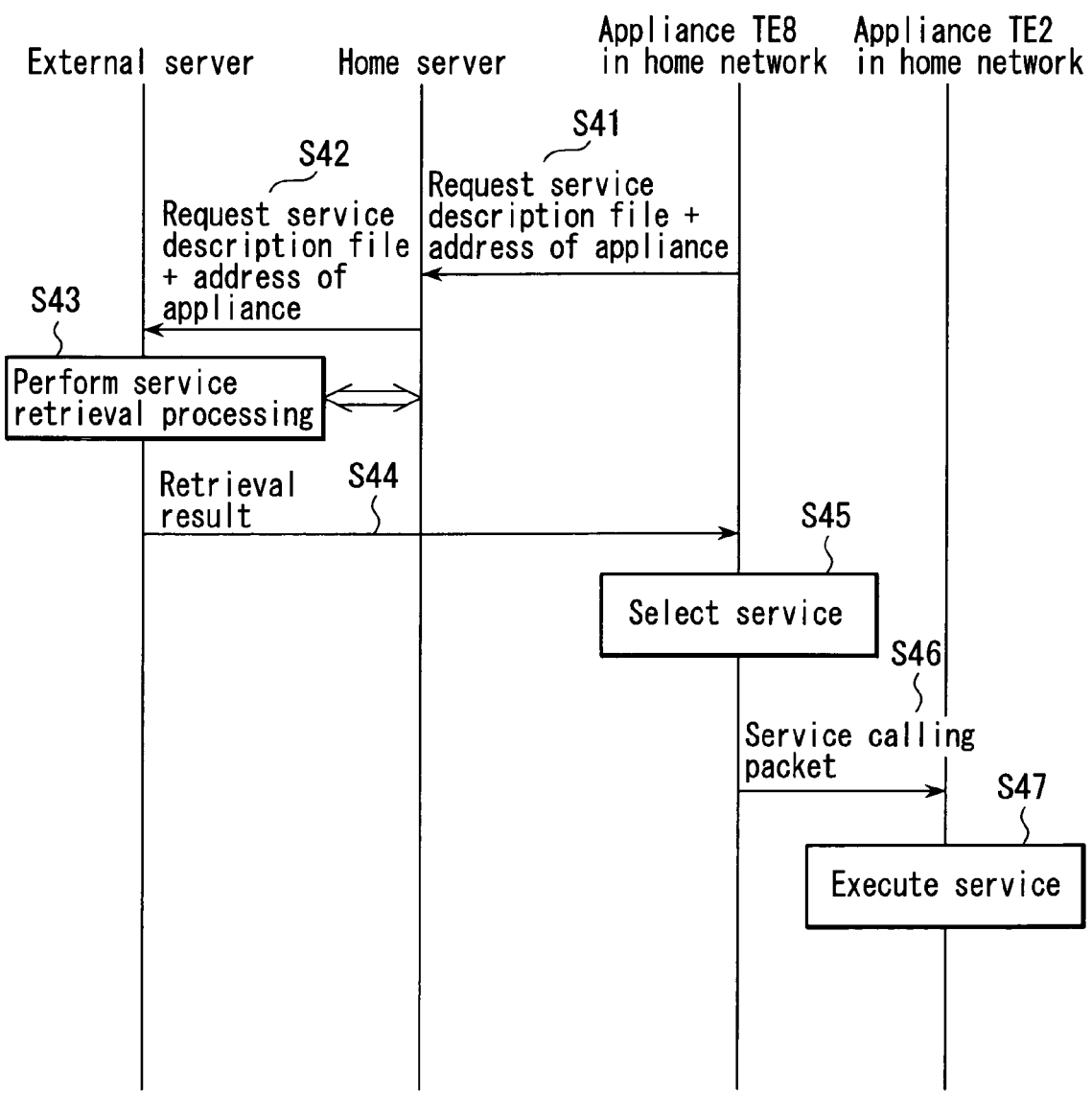
FIG. 23 is a flow chart for explaining still another processing apparatus in the system.

This operation will be described below with reference to FIG. 23. One (e.g., the printer as the appliance TE8) of the appliances TE1 to TE9 transmits packets containing a request service description file and the address of the appliance TE8 to the home server 1 (step S41). Although the home server 1 can perform service retrieval processing by using its own matchmaker unit 11, the home server 1 can entrust service retrieval processing to the server 100 for some reason. In entrusting service retrieval processing to the server 100, the home server 1 transmits the packets transmitted from the appliance TE8 in step S41 from the second transceiver unit 5 to the server 100 (step S42). At this time, the address of the transmission source of the packets is the address of the home server 1. Upon receiving the packets, the server 100 performs service retrieval processing as shown in FIG. 14 with respect to the service description files as retrieval targets stored in the service description file storing unit 2 of the home server 1 (step S43). In step S43, the server 100 accesses the home server 1 to receive the service description file registered in the home server 1, and performs service retrieval processing like that shown in FIG. 14. The subsequent processing (steps S44 to S47) is the same as that in steps S11 to S14 in FIG. 13.

Figure 24:
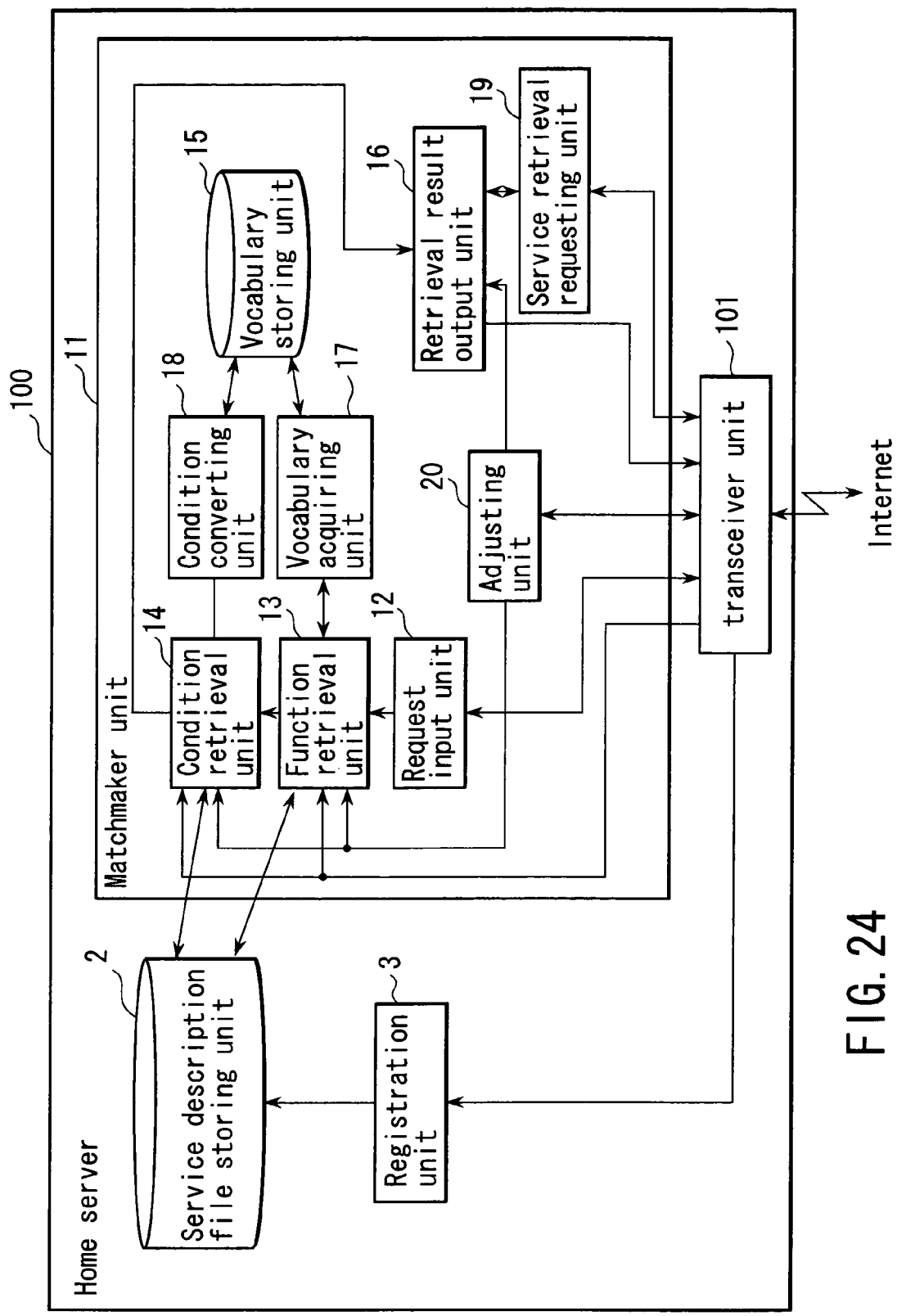
FIG. 24 is a block diagram showing the third arrangement example of the server.

(3) FIG. 24 shows the third arrangement example of the server 100. Note that the same reference numerals as in FIG. 17 denote the same parts in FIG. 24, and only different portions will be described. In the arrangement shown in FIG. 24, the ID assigning unit 102 is omitted. The service description files stored in the service description file storing unit 2 are the service description files of an indefinite number of appliances (at least appliances other than the appliances TE1 to TE9) which can access the server 100. One of the indefinite number of appliances is called appliance TE100. Note that the appliance TE100 also has an arrangement like the one shown in FIG. 3 or 4. The appliance TE100 is, for example, an appliance having a service function for time adjustment. Service description files of services which can be used with all kinds of appliances which can access the server 100 are called public services and are registered in the service description file storing unit 2.

Figure 25:
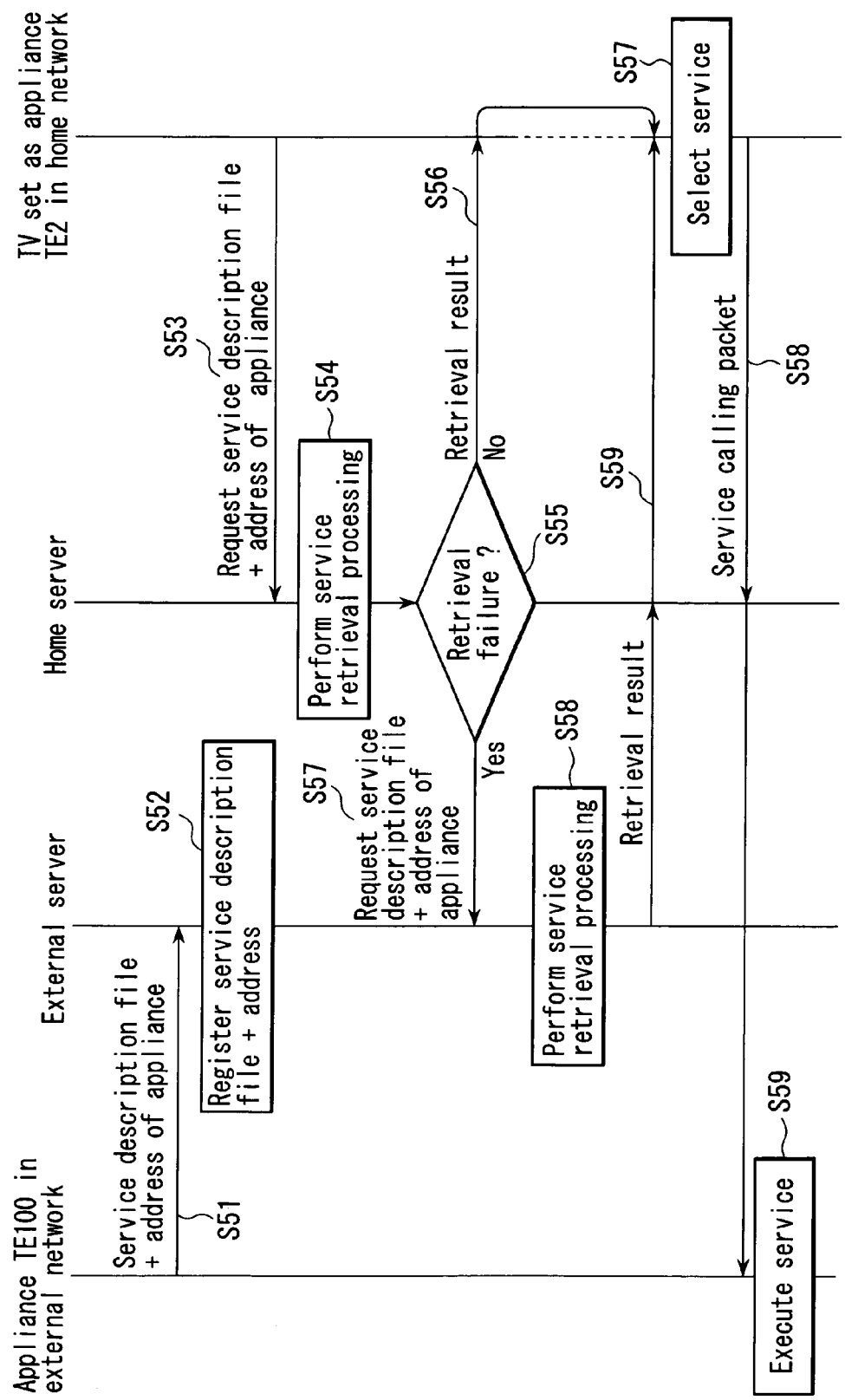
FIG. 25 is a flow chart for explaining still another processing operation in the system.

This operation will be described with reference to FIG. 25. The appliance TE100 transmits packets containing the service description file of the appliance TE100 and the address of the appliance TE100 (step S51). The server 100 stores the service description file and the address of the appliance TE100 contained in the packets as shown in FIG. 7 (step S52).

In this state, the TV set as the appliance TE2 transmits packets containing a request service description file and the address of the appliance TE2 to the home server 1 (step S53). Upon receiving the packets, the home server 1 performs service retrieval processing as shown in FIG. 14 with respect to the service description files as retrieval targets stored in the service description file storing unit 2 of the home server 1 (step S54). If at least one service description file can be obtained as a retrieval result, a retrieval result output unit 16 transmits it to the appliance TE2 as the request source (step S56). The subsequent processing (steps S57 to S59) is the same as that in steps S12 to S14 in FIG. 13 and that in steps S32 to S34 in FIG. 20.

Assume that no service description file can be obtained in step S54, which is identical or similar to the service and condition described in the request service description file. In this case, in order to request an external matchmaker unit to perform service retrieval processing, a service retrieval requesting unit 19 of the matchmaker unit 11 of the home server 1 transmits, to the server 100, the packets transmitted from the appliance TE2 in step S53 upon adding the address of the home server 1 thereto (step S57).

Figure 14:
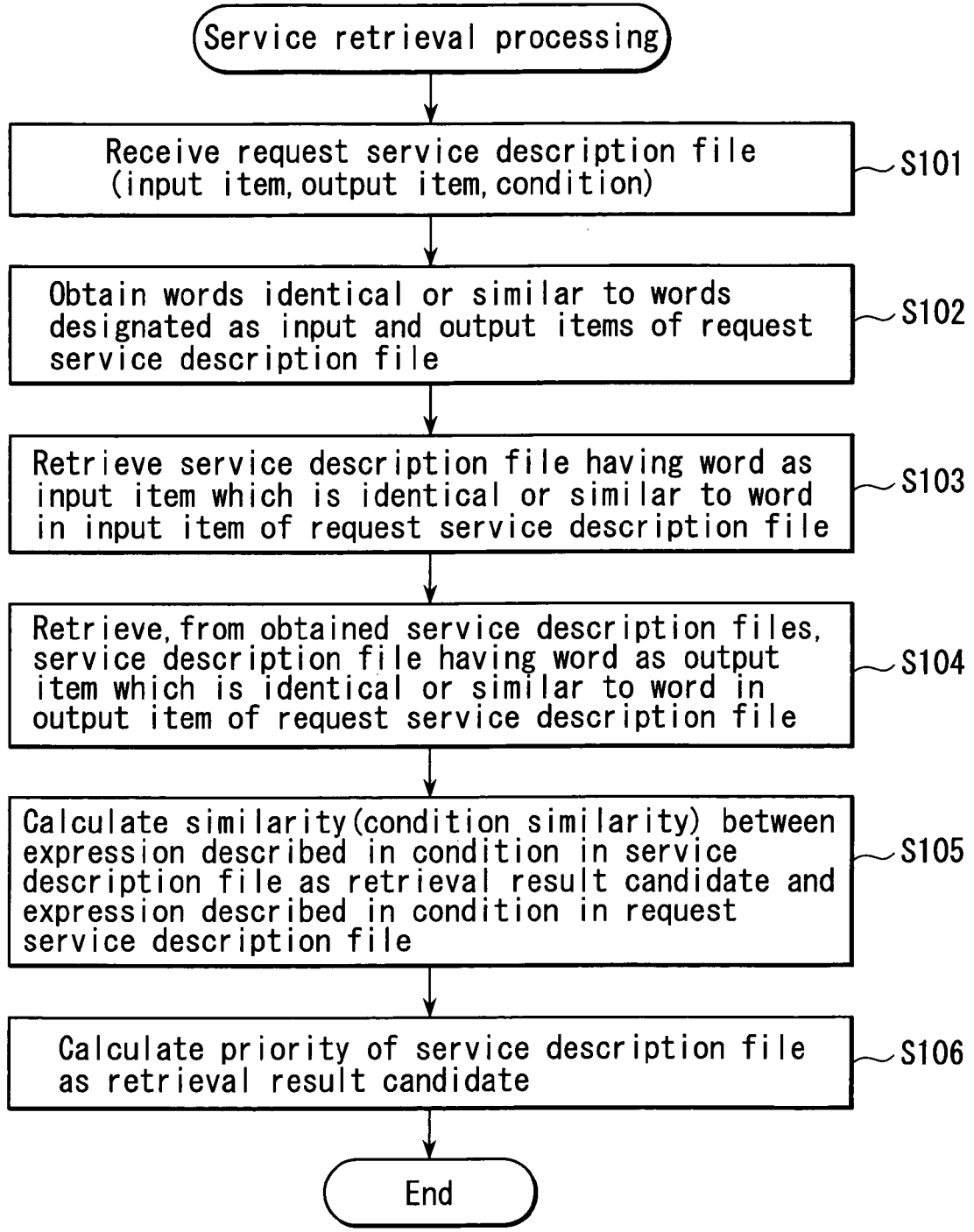
FIG. 14 is a flow chart for explaining service retrieval processing operation in a matchmaker unit.

Upon receiving the packets, the server 100 performs service retrieval processing as shown in FIG. 14 with respect to the service description files as retrieval targets stored in the service description file storing unit 2 of the server 100 (step S58). The server 100 then transmits the retrieval result to the home server 1 (step S59). The subsequent processing (steps S57 to S59) is the same as that in steps S12 to S14 in FIG. 13 and that in steps S32 to S34 in FIG. 20.

Third Embodiment

A matchmaker unit 11 and appliances TE1 to TE9 may have also the following functions.

(A) In the first embodiment, the function retrieval unit 13 of the matchmaker unit 11 performs service retrieval (function retrieval) by using both input and output items. However, the present invention is not limited to this. Service retrieval may be performed by using only an input item or output item. Alternatively, service retrieval may be performed by using only or a combination of items. If, for example, a word is described in only the input item of the input and output items of a request service description file (if no word is described in the output item or a word expressing "no designation" is described in the output item), only the processing in steps S102 and S103 in FIG. 14 is performed (step S104 is not executed). In this case, the service similarity of a service description file obtained as a retrieval result candidate is the similarity between the word described in the input item of the service description file and the word described in the input item of the request service description file.

Assume that "message" is designated as the input item of a request service description file, and no output item is designated. In this case, the function retrieval unit 13 obtains a service description file, as a retrieval result candidate, in which not only a service of displaying an input message but also a service of reading aloud are described (for example, a service description file in which "message" is described as an input item, and "displayable" or "reading aloud" as an output item).

Alternatively, even if both input and output items are designated in a request service description file, function retrieval may be performed by using only one of them. The appliance which has transmitted the request service description file may designate which one of the items is to be used. In this case, it suffices if the appliance transmits information designating one of the input and output items to the matchmaker unit 11 (e.g., a home server 1), together with a request service description file in the same packets. Although function retrieval is performed with respect to both the input item and the output item, the matchmaker unit 11 itself may switch to service retrieval using only the input item of the input and output items when a desired service description file (exhibiting a service similarity, condition similarity, or priority equal to or higher than a predetermined threshold) cannot be retrieved.

(B) An adjusting unit 20 adjusts the maximum value of the retrieval processing time in the function retrieval unit 13 or a condition retrieval unit 14 in accordance with the number of received request service description files (the number of service retrieval requests). If, for example, the number of service retrieval requests is equal to or more than a predetermined threshold, the maximum value of the retrieval processing time is set be smaller than a reference value.

In transmitting a request service description file, each of the appliances TE1 to TE9 also transmits option information for designating a maximum ontology distance (a reference for a similarity threshold between words defining a similarity range) used in a vocabulary acquiring unit 17 (a reference for a similarity threshold between words defining a similarity range), the number of retrieval results (the number of service description files to be obtained as retrieval results), or the like, together with the request service description file. This option information may be stored in advance in (a service retrieval requesting unit 63 of) each of the appliances TE1 to TE9. In this case, the adjusting unit 20 adjusts the maximum ontology distance used in the vocabulary acquiring unit 17, the number of retrieval results (the number of service description files obtained as retrieval results) and the like on the basis of the option information transmitted together with the request service description file.

(C) The ontology to be stored in a vocabulary storing unit 15 may be the one downloaded from the Internet or the like.

(D) Each of the appliances TE1 to TE9 may transmit, to the home server 1, information (e.g., URL) indicating the storage location of a service description file instead of transmitting a service description file itself to the home server 1. When, for example, a new service description file is generated by a description file generating unit 66 of one of the appliances TE1 to TE9, a service registration unit 62 stores the file in a predetermined storage area (e.g., the appliance TE7) on the home network, and notifies the home server 1 of a packet containing a URL representing the storage area. In this case, upon receiving the packet containing the URL, the home server 1 accesses URL contained in the packet, acquires a service description file, and registers it in the service description file storing unit 2.

If the service description files of the respective appliances TE1 to TE9 are stored in a fixed area, the home server 1 may store in advance the URL notified from each of the appliances TE1 to TE9, and may periodically access the respective appliances to update service description files.

(E) The system in the embodiments described above may use not only packets but also datagram, frame, message, segment, etc, for transmitting various kind of data and files.

As has been described, according to the embodiments described above, an optimal appliance which has a requested service and state can be retrieved by using the semantic correlation (e.g., an ontology) between words or expressions indicating the functions (services) or states of appliances used in the home. In addition, dynamic, ad-hoc liaison can be established between the respective appliances.

In addition, it can be assumed that appliances (home appliances) used in the home, e.g., the appliances TE1 to TE9 in FIG. 1, have various kinds of functions (services) and various states (e.g., states having a plurality of meanings). There are restrictions unique to home appliances. For example, home appliances have small calculation resources, are not necessarily kept powered on, and are required to be almost fully automatic. According to the embodiments described above, a function is retrieved on the basis of the semantic correlation between words (words described in input and output items) representing the respective functions (services). Therefore, the present invention can easily cope with diversification of functions and addition of unpredictable new functions in the future.

Note that as the above retrieval function, the following known technique may be used: Katia Sycara, Seth Widoff, Matthias Klusch and Jianguo Lu. LARKS, "Dynamic Matchmaking Among Heterogeneous Software Agents in. Cyberspace.", "Autonomous Agents and Multi-Agent Systems", Vol. 5, p. 173-203, 2002. Alternatively, the technique disclosed in "Extension of Retrieval Conditions for Services", NIKKEI Internet Technology, May 2002, p. 46 may be used. Assume that there is need for decision of synonyms or the like. In this case, as terms appearing in information items associated with a program language for input/output type definitions and the like, terms in Japanese Patent Application No. 2002-283974 previously filed by the present inventor.

In addition, if expressions to be used are limited to those expressing the states of appliances which are unique to home appliances, rules expressing the correlations between the expressions can be easily created. In addition, by entrusting service retrieval processing to external servers and reducing the data amount of retrieval results in accordance with available communication bands, the present invention can be flexibly applied within limited calculation resources, memory resources, and communication resources of home appliances.

As described above, according to the above embodiments, in accordance with various kinds of requests from appliances, optimal appliances for the requests can be easily retrieved from appliances which are assumed to have various kinds of functions (services) and various states. In addition, a service retrieval apparatus and method suitable for the use in the home can be provided.

The techniques of the present invention described in the embodiments of the present invention can be distributed by being stored as computer-executable programs in recording media such as magnetic disks (e.g., flexible disks and hard disks), optical disks (e.g., CD-ROMs and DVDs), and semiconductor memories.

What is claimed is:

1. A service retrieval apparatus which retrieves, from a plurality of service functions of a plurality of appliances, a service function identical or similar to a first function requested from a first appliance which is one of the appliances, comprising:

a first storing unit configured to store a plurality of service data items corresponding to the service functions respectively, each of the service data items including a word corresponding to an input item of corresponding one of the service functions, a word corresponding to an output item of the corresponding one of the service functions, and a condition including or not including a numerical range;

a second storing unit configured to store a plurality of words and information representing correlations among the words on the basis of meanings of the words;

a first receiving unit configured to receive a request data item which is transmitted from the first appliance and includes a word corresponding to the input item of the first function, and a condition including or not including a numerical range;

an acquiring unit configured to acquire, from the words stored in the second storing unit, a first word set which is a set of words having meanings identical or similar to a meaning of the word corresponding to the input item in the request data item;

a retrieving unit configured to retrieve, from the service data items, a group of service data items in each of which one word of the first word set is included as the input item;

a first calculating unit configured to calculate a condition similarity between the condition in each service data item of the group and the condition in the request data item, to set the condition similarity to a maximum value (1) in a first case where the condition in the request data item and the condition in the service data item of the group coincide with each other, (2) in a second case where the numerical range in the service data item of the group is included in the numerical range in the request data item, and (3) in a third case where one of the condition in the request data item and the condition in the service data item of the group can be converted to the other, and to set the condition similarity to a value near zero in a case other than the first case, the second case and the third case;

a second calculating unit configured to calculate a priority of each service data item of the group on the basis of a first similarity between the word corresponding to the input item in the service data item and the word corresponding to the input item in the request data item and the condition similarity; and a first transmitting unit configured to transmit a list to the first appliance, the list including at least the priority and an address of an appliance of the appliances which correspond to the each service data item of the group.

2. An apparatus according to claim 1, wherein each of the appliances is a home appliance used in a home.

3. An apparatus according to claim 1, wherein the appliances include a plurality of home appliances connected to a first network, and the first appliance is one of the home appliances, and wherein the retrieving unit retrieves the group from the service data items of the home appliances.

4. An apparatus according to claim 1, further comprising:

a second transmitting unit configured to transmit the request data item received by the first receiving unit to an external device through a second network;

a second receiving unit configured to receive a message which is transmitted from the external device and contains at least an address of a second appliance of the appliances, the second appliance corresponding to a service data item which includes the input and output items representing a service function identical or similar to the first function; and a third transmitting unit configured to transmit the message to the first appliance.

5. An apparatus according to claim 1, further comprising:

a second transmitting unit configured to transmit the request data item received by the first receiving unit to an external device connected to the service retrieval apparatus through a second network;

a second receiving unit configured to receive a message which is transmitted from the external device and contains an address of an external appliance corresponding to a service data item which includes the input and output items representing a service function different from the service functions and identical or similar to the first function; and a third transmitting unit configured to transmit the message to the first appliance.

6. An apparatus according to claim 1, further comprising:

a second acquiring unit configured to acquire, from the words stored in the second storing unit, a second word set which is a set of words having meanings identical or similar to a meaning of the word corresponding to the output item in the request data item; and wherein the retrieving unit retrieves the group in each of which one word of the first word set is included as the input item and one word of the second word set is included as the output item, and wherein the second calculating unit calculates the priority on the basis of the first similarity, the condition similarity, and a second similarity between the word corresponding to the output item in the each service data item of the group and the word corresponding to the output item in the request data item.

7. An apparatus according to claim 1, further comprising an adjusting unit configured to adjust a data amount of the list in accordance with a bandwidth which can be used for communication between the first appliance and the service retrieval apparatus.

8. An apparatus according to claim 1, wherein a condition converting unit is configured to determine that one of the condition in the request data item and the condition in the service data item of the group can be converted to the other if the one of the condition in the requested item can be reached by the condition in the service data item of the group.

9. A service retrieval method for retrieving, from a plurality of service functions of a plurality of appliances, a service function identical or similar to a first function requested from a first appliance which is one of the appliances, the method comprising:

(a) storing a plurality of service data items corresponding to the service functions respectively in the first memory device, each of the service data items including a word corresponding to an input item of corresponding one of the service functions, a word corresponding to an output item of corresponding one of the service functions, and a condition including or not including a numerical range;

(b) storing a plurality of words and information representing correlations among the words on the basis of meanings of the words, in the second memory device;

(c) receiving a request data item which is transmitted from the first appliance and includes a word corresponding to the input item of the first function, and a condition including or not including a numerical range;

(d) acquiring from the words stored in the second memory device, a first word set which is a set of words having meanings identical or similar to a meaning of the word corresponding to the input item in the request data item;

(e) retrieving from the service data items, a group of service data items in each of which one word of the first word set is included as the input item;

(f) calculating a condition similarity between the condition in each service data item of the group and the condition in the request data item, to set the condition similarity to a maximum value (1) in a first case where the condition in the request data item and the condition in the service data item of the group coincide with each other, (2) in a second case where the numerical range in the service data item of the group is included in the numerical range in the request data item, and (3) in a third case where one of the condition in the request data item and the condition in the service data item of the group can be converted to the other, and to set the condition similarity to a value near zero in a case other than the first case, the second case and the third case;

(g) calculating a priority of each service data item of the group on the basis of a first similarity between the word corresponding to the input item in the service data item and the word corresponding to the input item in the request data item and the condition similarity; and (h) transmitting a list to the first appliance, the list including at least the priority and an address of an appliance of the appliances which correspond to the each service data item.

10. A method according to claim 9, wherein the appliances include a plurality of home appliances connected to a first network, and the first appliance is one of the home appliances, and wherein retrieving includes retrieving the group from the service data items of the home appliances.

11. A method according to claim 9, which includes transmitting the request data item received to an external device through a second network;

receiving a message which is transmitted from the external device and contains at least an address of a second appliance of the appliances, the second appliance corresponding to a service data item which includes the input and output items representing a service function identical or similar to the first function; and transmitting the message to the first appliance.

12. A method according to claim 9, which includes transmitting the request data item to an external device connected to the service retrieval apparatus through a second network;

receiving a message which is transmitted from the external device and contains an address of an external appliance corresponding to a service data item which includes the input and output items representing a service function different from the service functions and identical or similar to the first function; and transmitting the message to the first appliance.

13. A method according to claim 9, which includes acquiring from the words stored in the second memory device, a second word set which is a set of words having meanings identical or similar to a meaning of the word corresponding to the output item in the request data item; and wherein the retrieving includes retrieving the group in each of which one word of the first word set is included as the input item and one word of the second word set is included as the output item, and wherein calculating the priority includes calculating the priority on the basis of the first similarity, the condition similarity, and a second similarity between the word corresponding to the output item in the each service data item and the word corresponding to the output item in the request data item.

14. A method according to claim 9, which includes adjusting a data amount of the list in accordance with a bandwidth which can be used for communication between the first appliance and the service retrieval apparatus.

* * * * *